United States Patent
Demura

(10) Patent No.: US 12,514,430 B2
(45) Date of Patent: Jan. 6, 2026

(54) ENDOSCOPE SYSTEM FOR PERFORMING DETECTION OF LESION CANDIDATE REGIONS AND METHOD OF OPERATING THE SAME

(71) Applicant: FUJIFILM Corporation, Tokyo (JP)

(72) Inventor: Takanori Demura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 408 days.

(21) Appl. No.: 18/153,246

(22) Filed: Jan. 11, 2023

(65) Prior Publication Data
US 2023/0165433 A1 Jun. 1, 2023

Related U.S. Application Data

(63) Continuation of application No. PCT/JP2021/005202, filed on Feb. 12, 2021.

(30) Foreign Application Priority Data

Jul. 15, 2020 (JP) .................................. 2020-121680

(51) Int. Cl.
*A61B 1/00* (2006.01)
*A61B 1/04* (2006.01)
(Continued)

(52) U.S. Cl.
CPC .... *A61B 1/000094* (2022.02); *A61B 1/00006* (2013.01); *A61B 1/0002* (2013.01); *A61B 1/0005* (2013.01); *A61B 1/0638* (2013.01); *G06T 7/0014* (2013.01); *G06T 7/11* (2017.01); *G06T 7/70* (2017.01); *A61B 1/04* (2013.01);
(Continued)

(58) Field of Classification Search
None
See application file for complete search history.

(56) References Cited

U.S. PATENT DOCUMENTS

2008/0303898 A1 12/2008 Nishimura
2017/0112356 A1* 4/2017 Mitsui ................ A61B 1/00186
(Continued)

FOREIGN PATENT DOCUMENTS

JP H06-181885 A 7/1994
JP 2008-301968 A 12/2008
(Continued)

OTHER PUBLICATIONS

International Search Report issued in PCT/JP2021/005202; mailed Apr. 27, 2021.
(Continued)

*Primary Examiner* — John P Leubecker
(74) *Attorney, Agent, or Firm* — Studebaker Brackett PLLC

(57) ABSTRACT

Image comparison processing between a first lesion candidate image obtained at a time of first observation and a second lesion candidate image obtained at a time of second observation is performed. In a case where a determination that a lesion candidate region is missing is made as a result of the image comparison processing, a subscreen is automatically newly displayed on a display. The first lesion candidate image stored in a captured image storage memory is automatically displayed on the subscreen.

9 Claims, 14 Drawing Sheets

(51) Int. Cl.
*A61B 1/06* (2006.01)
*G06T 7/00* (2017.01)
*G06T 7/11* (2017.01)
*G06T 7/70* (2017.01)

(52) U.S. Cl.
CPC .............. *G06T 2207/10068* (2013.01); *G06T 2207/30096* (2013.01)

(56) References Cited

U.S. PATENT DOCUMENTS

| | | | |
|---|---|---|---|
| 2019/0114738 A1* | 4/2019 | Sonoda | A61B 1/000094 |
| 2019/0374088 A1* | 12/2019 | Watanabe | A61B 1/0638 |
| 2020/0129042 A1 | 4/2020 | Takahashi et al. | |
| 2021/0042925 A1* | 2/2021 | Usuda | A61B 1/000094 |
| 2021/0106209 A1* | 4/2021 | Usuda | A61B 1/0005 |
| 2021/0161366 A1 | 6/2021 | Usuda | |

FOREIGN PATENT DOCUMENTS

| | | |
|---|---|---|
| WO | 2018/159363 A | 9/2018 |
| WO | 2018/216617 A1 | 11/2018 |
| WO | 2019/220848 A1 | 11/2019 |
| WO | 2020/017212 A1 | 1/2020 |
| WO | 2020/039931 A1 | 2/2020 |

OTHER PUBLICATIONS

International Preliminary Report On Patentability and Written Opinion issued in PCT/JP2021/005202; issued Jan. 17, 2023.

The extended European search report issued by the European Patent Office on Nov. 7, 2023, which corresponds to European Patent Application No. 2184711.1-1126 and is related to U.S. Appl. No. 18/153,246.

\* cited by examiner

| POSITIONAL INFORMATION COMPARISON PROCESSING | IMAGE COMPARISON PROCESSING | DETERMINATION |
|---|---|---|
| MATCHING | MATCHING | LESION CANDIDATE REGION IS NOT MISSING |
| MATCHING | NOT MATCHING | LESION CANDIDATE REGION IS MISSING |

ENDOSCOPE SYSTEM FOR PERFORMING DETECTION OF LESION CANDIDATE REGIONS AND METHOD OF OPERATING THE SAME

CROSS-REFERENCE TO RELATED APPLICATIONS

This application is a Continuation of PCT International Application No. PCT/JP2021/005202 filed on 12 Feb. 2021, which claims priority under 35 U.S.C § 119 (a) to Japanese Patent Application No. 2020-121680 filed on 15 Jul. 2020. The above application is hereby expressly incorporated by reference, in its entirety, into the present application.

BACKGROUND OF THE INVENTION

1. Field of the Invention

The present invention relates to an endoscope system that performs automatic detection of a predetermined lesion candidate region represented by a lesion portion based on AI using image processing, and a method of operating the same.

2. Description of the Related Art

In the medical field, diagnosis using an endoscope system comprising a light source device, an endoscope, and a processor device has been widely performed. In the endoscope system, an observation target is irradiated with illumination light emitted by the light source device through the endoscope, and the processor device generates an image of the observation target based on an image signal obtained by picking up the image of the observation target illuminated with the illumination light. By displaying the image on a display, a doctor can perform diagnosis while viewing the image on the display.

In endoscopy, some doctors perform observation using normal light irradiation at a time of insertion of an endoscope insertion part and perform observation using special light at a time of retraction. However, in a case where a lesion at the time of insertion in which only the normal light is used is missing, it is difficult to find the lesion again at the time of retraction. Thus, a technology for capturing the lesion candidate region that is not frozen or captured by a doctor at the time of insertion of the endoscope but is suspected to be a lesion using the normal light and the special light, and performing AI processing as needed has been developed. For example, in a case where a computer reports information about the lesion candidate region obtained by special light irradiation by displaying the information in a superimposed manner on an image obtained by the normal light irradiation instead of the doctor at a time of endoscopic diagnosis, the doctor can be prevented from missing the lesion candidate region. Thus, this is expected to increase accuracy of the endoscopic diagnosis.

Specifically, in WO2018/159363A (corresponding to US2019/0374088A1), comparison processing between first identification information including an image feature amount detected at a time of first diagnosis and second identification information including an image feature amount detected at a time of second diagnosis in an endoscope is performed. In a case where a determination that there is a difference is made, missing is reported using symbol assignment on a normal light diagnosis image or sound.

SUMMARY OF THE INVENTION

A user performs observation by focusing on an observation image displayed on a display. Thus, while the user pays attention to the observation image, the user may not pay sufficient attention to, for example, the "symbol assignment or sound" of WO2018/159363A made at a time of reporting missing, other than the observation image. In this case, an alert of the "symbol assignment or sound" of WO2018/159363A may not be noticed. Therefore, instead of the "symbol assignment or sound" of WO2018/159363A, it is required to make a missing alert easily noticed by the user performing observation by focusing on the observation image.

An object of the present invention is to provide an endoscope system and a method of operating the same that can perform a missing prevention alert easily noticed by a user performing observation by focusing on an observation image on a display in a case of reporting missing of a lesion candidate region.

An endoscope system according to an aspect of the present invention comprises a display having a main screen on which an observation image is displayed, and an image control processor, in which the image control processor is configured to, in a case where a first lesion candidate image is detected at a time of first observation in which an endoscope insertion part moves from an insertion opening to an end position of an observable range inside a lumen, perform an automatic capture of automatically capturing the first lesion candidate image in association with first positional information and, in a case where a second lesion candidate image is detected at a time of second observation in which the endoscope insertion part moves from the end position of the observable range to the insertion opening inside the lumen, perform an automatic capture of automatically capturing the second lesion candidate image in association with second positional information, store the first lesion candidate image and the first positional information obtained by the automatic capture in a captured image storage memory, perform positional information comparison processing between the first positional information and the second positional information and, in a case where the first positional information and the second positional information match, perform image comparison processing between the first lesion candidate image and the second lesion candidate image, and in a case where a determination that a lesion candidate region is missing is made as a result of the image comparison processing, automatically newly display a subscreen on the display and automatically display the first lesion candidate image stored in the captured image storage memory on the subscreen.

In addition, an endoscope system according to another aspect of the present invention comprises a display having a main screen on which an observation image is displayed and a subscreen provided at a different position from the main screen, and an image control processor, in which the image control processor is configured to, in a case where a first lesion candidate image is detected at a time of first observation in which an endoscope insertion part moves from an insertion opening to an end position of an observable range inside a lumen, perform an automatic capture of automatically capturing the first lesion candidate image in association with first positional information and, in a case where a second lesion candidate image is detected at a time of second observation in which the endoscope insertion part moves from the end position of the observable range to the insertion opening inside the lumen, perform an automatic capture of automatically capturing the second lesion candidate image in association with second positional information, store the first lesion candidate image and the first positional information obtained by the automatic capture in a captured image storage memory, perform positional information comparison processing between the first positional information and the second positional information and, in a case where the first positional information and the second positional information match, perform image comparison processing between the first lesion candidate image and the second lesion candidate image, and in a case where a determination that a lesion candidate region is missing is made as a result of the image comparison processing, automatically display the first lesion candidate image stored in the captured image storage memory on the subscreen of the display.

In addition, an endoscope system according to still another aspect of the present invention comprises a display having a main screen on which an observation image is displayed, and an image control processor, in which the image control processor is configured to, in a case where a first lesion candidate image is detected at a time of first observation in which an endoscope insertion part moves from an insertion opening to an end position of an observable range inside a lumen, perform an automatic capture of automatically capturing the first lesion candidate image in association with first positional information and, in a case where a second lesion candidate image is detected at a time of second observation in which the endoscope insertion part moves from the end position of the observable range to the insertion opening inside the lumen, perform an automatic capture of automatically capturing the second lesion candidate image in association with second positional information, store the first lesion candidate image and the first positional information obtained by the automatic capture in a captured image storage memory, perform positional information comparison processing between the first positional information and the second positional information and, in a case where the first positional information and the second positional information match, perform image comparison processing between the first lesion candidate image and the second lesion candidate image, and in a case where a determination that a lesion candidate region is missing is made as a result of the image comparison processing, automatically switch display of the main screen from the observation image to the first lesion candidate image stored in the captured image storage memory.

It is preferable that the image control processor is configured to, in a case where the determination that the lesion candidate region is missing is made, display positional information of the lesion candidate region on the main screen.

It is preferable that the image control processor is configured to, in a case where the determination that the lesion candidate region is missing is made, display a guide indicating a direction of the lesion candidate region on the main screen.

It is preferable that the endoscope system further comprises a light source device that emits normal light and special light having different wavelength characteristics, a light source processor configured to emit the normal light with a first emission pattern and emit the special light with a second emission pattern in a case of automatically switching between a normal illumination period in which the normal light is emitted and a special illumination period in which the special light is emitted, and an image pick-up sensor that outputs a normal image signal obtained by picking up an image of an observation target illuminated with the normal light and a special image signal obtained by picking up an image of the observation target illuminated with the special light, in which the image control processor displays, on the display, an observation image with an analysis result displaying an analysis result obtained by performing analysis processing based on the special image signal on the observation image based on the normal image signal, and performs the automatic capture in a case where the lesion candidate region is detected based on the analysis result.

It is preferable that the first emission pattern is any one of a first A emission pattern in which the number of frames of the normal illumination period is the same for each normal illumination period, and a first B emission pattern in which the number of frames of the normal illumination period is different for each normal illumination period.

It is preferable that the second emission pattern is any one of a second A emission pattern in which the number of frames of the special illumination period is the same for each special illumination period and an emission spectrum of the special light is the same for each special illumination period, a second B emission pattern in which the number of frames of the special illumination period is the same for each special illumination period and the emission spectrum of the special light is different for each special illumination period, a second C emission pattern in which the number of frames of the special illumination period is different for each special illumination period and the emission spectrum of the special light is the same for each special illumination period, and a second D emission pattern in which the number of frames of the special illumination period is different for each special illumination period and the emission spectrum of the special light is different for each special illumination period.

It is preferable that the lesion candidate region is detected by picking up the image of the observation target by illumination with the second emission pattern.

It is preferable that the special image signal acquired by picking up the image of the observation target by illumination with the second emission pattern is not used for image display.

A method of operating an endoscope system according to still another aspect of the present invention is a method of operating an endoscope system including a display having a main screen on which an observation image is displayed, and an image control processor, the method comprising, by the image control processor, a step of performing, in a case where a first lesion candidate image is detected at a time of first observation in which an endoscope insertion part moves from an insertion opening to an end position of an observable range inside a lumen, an automatic capture of automatically capturing the first lesion candidate image in association with first positional information and performing, in a case where a second lesion candidate image is detected at a time of second observation in which the endoscope insertion part moves from the end position of the observable range to the insertion opening inside the lumen, an automatic capture of automatically capturing the second lesion candidate image in association with second positional information, a step of storing the first lesion candidate image and the first positional information obtained by the automatic capture in a captured image storage memory, a step of performing positional information comparison processing between the first positional information and the second positional information and performing, in a case where the first positional information and the second positional information match, image comparison processing between the first lesion candidate image and the second lesion candidate image, and a step of automatically newly displaying, in a case where a determination that a lesion candidate region is missing is made as a result of the image comparison processing, a subscreen on the display and automatically displaying the first lesion candidate image stored in the captured image storage memory on the subscreen.

In addition, a method of operating an endoscope system according to still another aspect of the present invention is a method of operating an endoscope system including a display having a main screen on which an observation image is displayed and a subscreen provided at a different position from the main screen, and an image control processor, the method comprising, by the image control processor, a step of performing, in a case where a first lesion candidate image is detected at a time of first observation in which an endoscope insertion part moves from an insertion opening to an end position of an observable range inside a lumen, an automatic capture of automatically capturing the first lesion candidate image in association with first positional information and performing, in a case where a second lesion candidate image is detected at a time of second observation in which the endoscope insertion part moves from the end position of the observable range to the insertion opening inside the lumen, an automatic capture of automatically capturing the second lesion candidate image in association with second positional information, a step of storing the first lesion candidate image and the first positional information obtained by the automatic capture in a captured image storage memory, a step of performing positional information comparison processing between the first positional information and the second positional information and performing, in a case where the first positional information and the second positional information match, image comparison processing between the first lesion candidate image and the second lesion candidate image, and a step of automatically displaying, in a case where a determination that a lesion candidate region is missing is made as a result of the image comparison processing, the first lesion candidate image stored in the captured image storage memory on the subscreen of the display.

In addition, a method of operating an endoscope system according to still another aspect of the present invention is a method of operating an endoscope system including a display having a main screen on which an observation image is displayed, and an image control processor, the method comprising, by the image control processor, a step of performing, in a case where a first lesion candidate image is detected at a time of first observation in which an endoscope insertion part moves from an insertion opening to an end position of an observable range inside a lumen, an automatic capture of automatically capturing the first lesion candidate image in association with first positional information and performing, in a case where a second lesion candidate image is detected at a time of second observation in which the endoscope insertion part moves from the end position of the observable range to the insertion opening inside the lumen, an automatic capture of automatically capturing the second lesion candidate image in association with second positional information, a step of storing the first lesion candidate image and the first positional information obtained by the automatic capture in a captured image storage memory, a step of performing positional information comparison processing between the first positional information and the second positional information and performing, in a case where the first positional information and the second positional information match, image comparison processing between the first lesion candidate image and the second lesion candidate image, and a step of automatically switching, in a case where a determination that a lesion candidate region is missing is made as a result of the image comparison processing, display of the main screen from the observation image to the first lesion candidate image stored in the captured image storage memory.

According to the present invention, missing of a lesion candidate region in a case of using an automatic detection function of the lesion candidate region can be prevented.

DESCRIPTION OF THE PREFERRED EMBODIMENTS

First Embodiment

Figure 1:
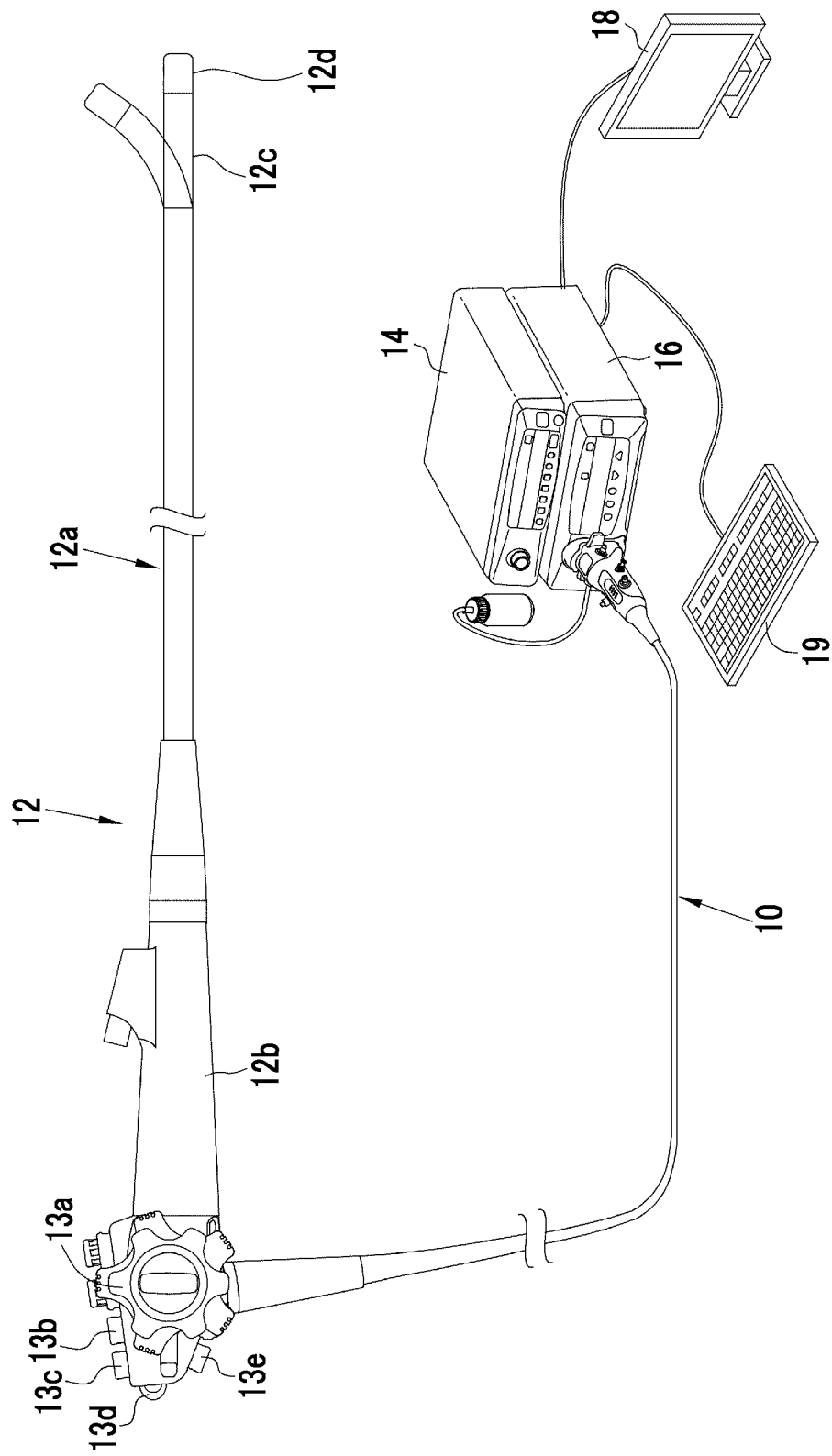
FIG. 1 is a diagram illustrating an external view of an endoscope system.

As illustrated in FIG. 1, an endoscope system 10 includes an endoscope 12, a light source device 14, a processor device 16, a display 18, and a user interface 19. The endoscope 12 is optically connected to the light source device 14 and is electrically connected to the processor device 16. The endoscope 12 includes an insertion part 12a inserted into a subject, an operating part 12b provided in a proximal end part of the insertion part 12a, and a bendable part 12c and a distal end 12d provided on a distal end side of the insertion part 12a. A bending operation is performed on the bendable part 12c by operating an angle knob 13a of the operating part 12b. By this bending operation, the distal end 12d is directed in a desired direction.

In addition, not only the angle knob 13a but also a captured image acquisition instruction unit 13b used for an operation of manually acquiring an image, a mode selector switch 13c used for an operation of switching an observation mode, a zoom operation part 13d used for an operation of changing a zoom magnification, and a positional information switching unit 13e that switches a pattern of positional information are provided in the operating part 12b. The captured image acquisition instruction unit 13b is used for performing a manual capture of manually acquiring an image of an observation target. In a case where the image is acquired by operating the captured image acquisition instruction unit 13b by a user, the acquired image is stored in a captured image storage memory 70 (refer to FIG. 2). A storage control of the image includes not only the manual capture but also an automatic capture of automatically capturing a lesion candidate image in association with the positional information in a case where the lesion candidate image is detected.

The endoscope system 10 has a normal observation mode, a special observation mode, and an alert mode as the observation mode. In a case where the observation mode is the normal observation mode, normal light obtained by multiplexing light of a plurality of colors with a light quantity ratio Lc for the normal observation mode is emitted, and a normal observation image is displayed on the display 18 based on a normal image signal obtained by picking up an image of the observation target illuminated with the normal light. In addition, in a case where the observation mode is the special observation mode, special light obtained by multiplexing light of a plurality of colors with a light quantity ratio Ls for the special observation mode is emitted, and a special observation image is displayed on the display 18 based on a special image signal obtained by picking up an image of the observation target illuminated with the special light.

In addition, in a case where the observation mode is the alert mode, the normal light and the special light are alternately emitted. The observation image obtained by picking up the image of the observation target illuminated with the normal light is displayed on a main screen 18a of the display 18. In addition, in the alert mode, in a case where a lesion candidate region is detected at a time of first observation, an image is acquired as a first lesion candidate image from the normal image signal using the normal light, an analysis result is acquired from the special image signal using the special light, and the image and the analysis result are stored in the captured image storage memory 70. At a time of second observation, in a case where a position at which the distal end 12d has detected the lesion candidate region at the time of the first observation is calculated, and there is a missing lesion candidate region, a subscreen 18b is automatically newly displayed on the display 18, and the first lesion candidate image stored in the captured image storage memory 70 is displayed.

The processor device 16 is electrically connected to the display 18 and the user interface 19. The display 18 displays the image of the observation target, subsidiary information of the image, and the like as an output. The user interface 19 receives an operation of inputting a function setting and the like.

Figure 2:
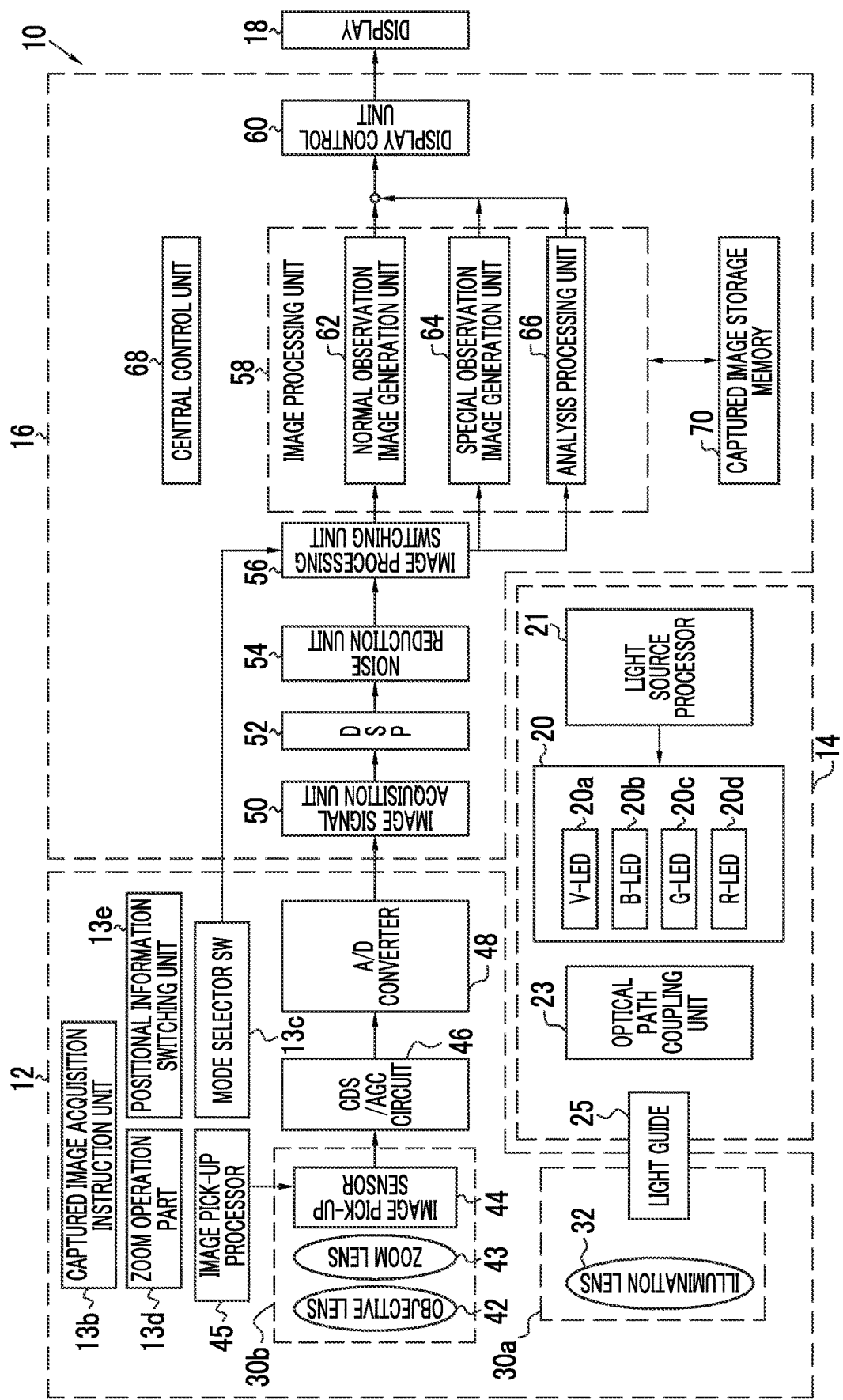
FIG. 2 is a block diagram illustrating functions of the endoscope system.

In FIG. 2, the light source device 14 comprises a light source unit 20 and a light source processor 21 that controls the light source unit 20. The light source unit 20 includes a plurality of semiconductor light sources, turns on or turns off each of the plurality of semiconductor light sources, and in a case of turning on, emits illumination light with which the observation target is illuminated by controlling an emitted light quantity of each semiconductor light source. In the present embodiment, the light source unit 20 includes LEDs of four colors of a violet light emitting diode (V-LED) 20a, a blue light emitting diode (B-LED) 20b, a green light emitting diode (G-LED) 20c, and a red light emitting diode (R-LED) 20d.

Figure 3:
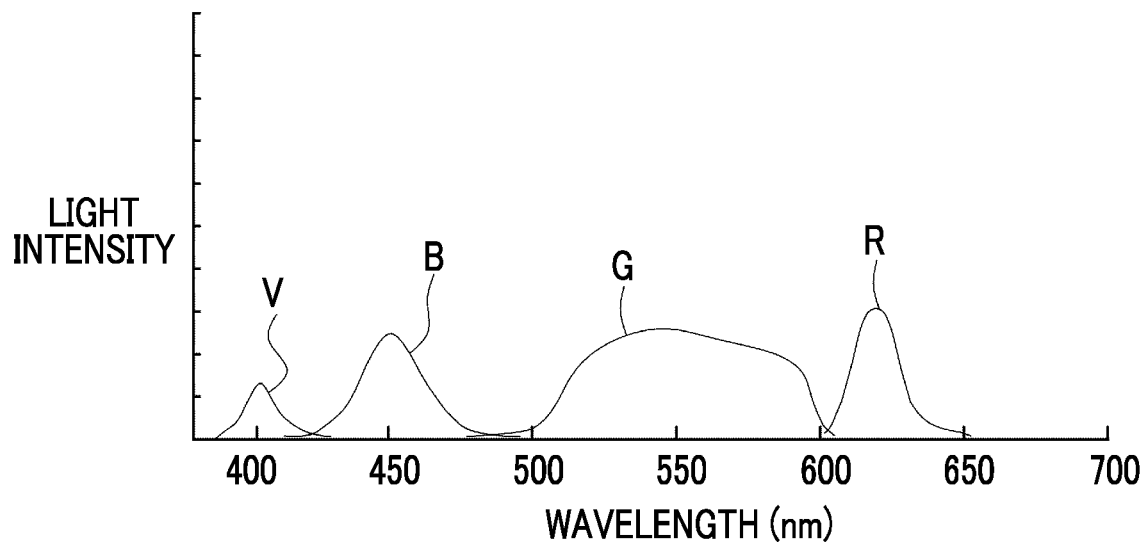
FIG. 3 is a graph illustrating emission spectra of violet light V, blue light B, green light G, and red light R.

As illustrated in FIG. 3, the V-LED 20a generates violet light V having a central wavelength of 405±10 nm and a wavelength range of 380 to 420 nm. The B-LED 20b generates blue light B having a central wavelength of 450±10 nm and a wavelength range of 420 to 500 nm. The G-LED 20c generates green light G having a wavelength range of 480 to 600 nm. The R-LED 20d generates red light R having a central wavelength of 620 to 630 nm and a wavelength range of 600 to 650 nm.

The light source processor 21 controls the V-LED 20a, the B-LED 20b, the G-LED 20c, and the R-LED 20d. By controlling each of the LEDs 20a to 20d independently of each other, the light source processor 21 can emit the violet light B, the blue light B, the green light G, or the red light R by changing a light quantity independently of each other. In addition, at a time of the normal observation mode, the light source processor 21 controls each of the LEDs 20a to 20d so that white light for which a light quantity ratio among the violet light V, the blue light B, the green light G, and the red light R is Vc:Bc:Gc:Rc is emitted. Here, Vc, Bc, Gc, and Rc>0 is established.

In addition, at a time of the special observation mode, the light source processor 21 controls each of the LEDs 20a to 20d so that the special light for which the light quantity ratio among the violet light V, the blue light B, the green light G, and the red light R is Vs:Bs:Gs:Rs as narrow-band light having a short wavelength is emitted. The light quantity ratio Vs:Bs:Gs:Rs is different from the light quantity ratio Vc:Bc:Gc:Rc used at the time of the normal observation mode and is appropriately determined in accordance with an observation purpose. For example, in a case of highlighting a surface layer blood vessel, it is preferable to set Vs to be greater than the other Bs, Gs, and Rs. In a case of highlighting middle and deep layer blood vessels, it is preferable to set Gs to be greater than the other Vs, Gs, and Rs.

In addition, in a case of emitting by automatically switching between the normal light and the special light at a time of the alert mode, the light source processor 21 emits the normal light with a first emission pattern and emits the special light with a second emission pattern. Specifically, it is preferable that the first emission pattern is any of a first A emission pattern in which the number of frames between normal illumination periods is the same for each normal illumination period as illustrated in FIG. 4, and a first B emission pattern in which the number of frames between the normal illumination periods is different for each normal illumination period as illustrated in FIG. 5.

Figure 4:
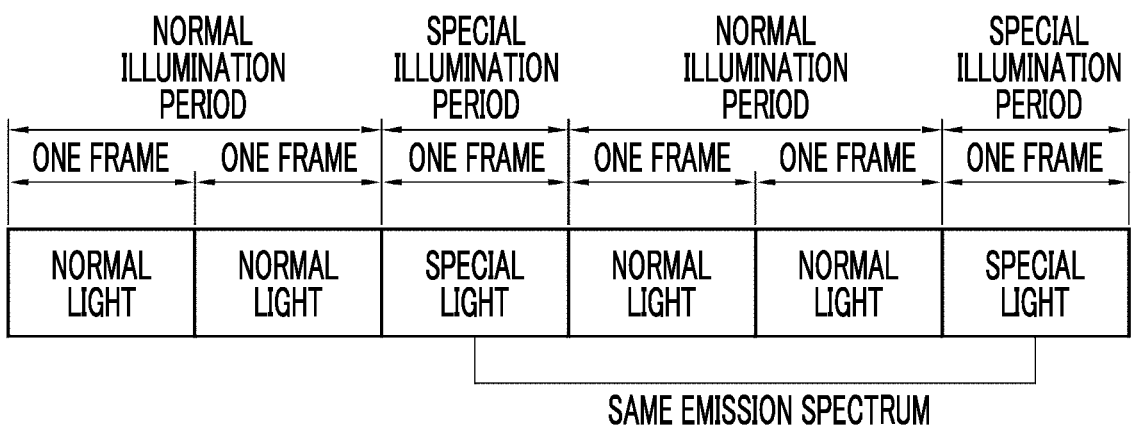
FIG. 4 is a description diagram illustrating a first A emission pattern and a second A emission pattern at a time of an alert mode.
Figure 5:
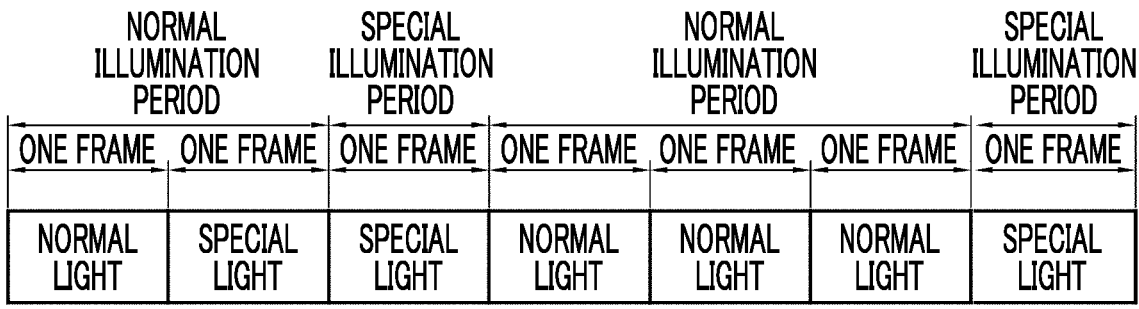
FIG. 5 is a description diagram illustrating a first B emission pattern at the time of the alert mode.
Figure 6:
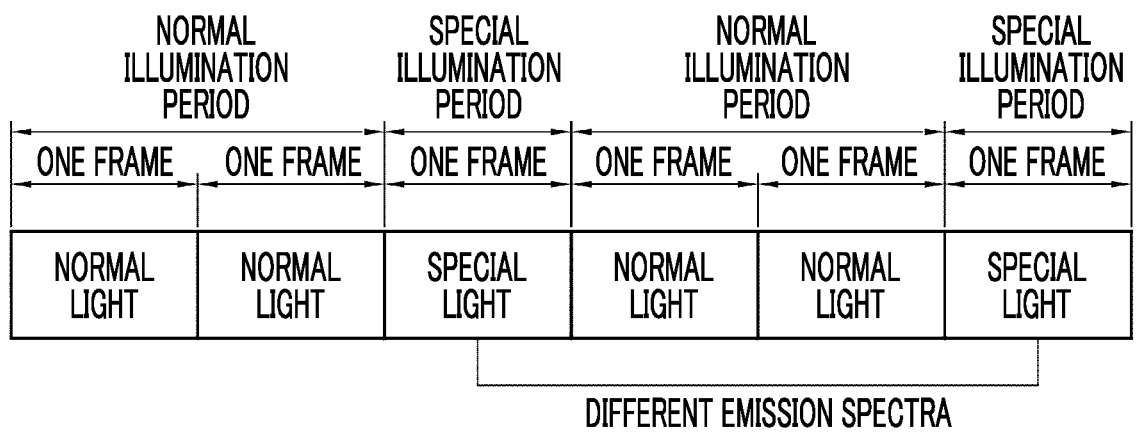
FIG. 6 is a description diagram illustrating a second B emission pattern at the time of the alert mode.
Figure 7:
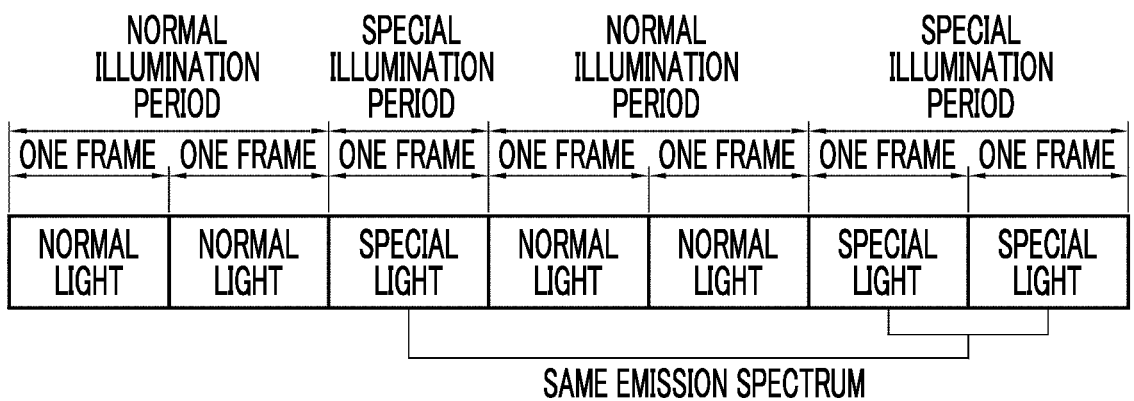
FIG. 7 is a description diagram illustrating a second C emission pattern at the time of the alert mode.
Figure 8:
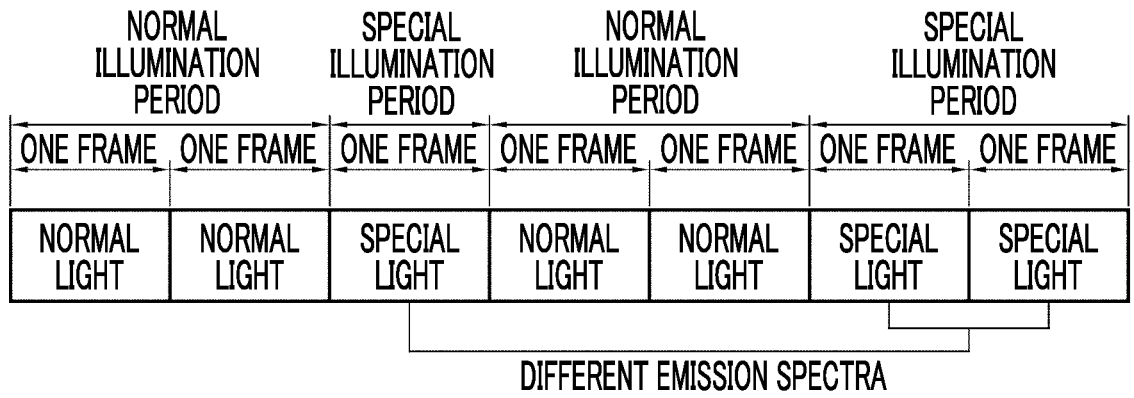
FIG. 8 is a description diagram illustrating a second D emission pattern at the time of the alert mode.

It is preferable that the second emission pattern is any of a second A emission pattern in which the number of frames of a special illumination period is the same for each special illumination period and an emission spectrum of the special light is the same for each special illumination period as illustrated in FIG. 4, a second B emission pattern in which the number of frames of the special illumination period is the same for each special illumination period and the emission spectrum of the special light is different for each special illumination period as illustrated in FIG. 6, a second C emission pattern in which the number of frames of the special illumination period is different for each special illumination period and the emission spectrum of the special light is the same for each special illumination period as illustrated in FIG. 7, and a second D emission pattern in which the number of frames of the special illumination period is different for each special illumination period and the emission spectrum of the special light is different for each special illumination period as illustrated in FIG. 8. An emission spectrum of the normal light may be the same or different for each normal illumination period.

Here, it is preferable that the normal illumination period is longer than the special illumination period, and it is preferable that the normal illumination period is two frames or more. For example, in FIG. 4, in a case where the first emission pattern is set to the first A emission pattern and the second emission pattern is set to the second A emission pattern (the number of frames of the special illumination period: same, and the emission spectrum of the special light: same), the normal illumination period is set to two frames, and the special illumination period is set to one frame. The normal light is used for generating the observation image displayed on the display 18. Thus, it is preferable that a bright image is obtained by irradiating the observation target with the normal light.

It is preferable that the normal light is white light. On the other hand, the special light is used for analysis processing. Thus, it is preferable that an image appropriate for the analysis processing is obtained by irradiating the observation target with the special light. For example, in a case of performing the analysis processing based on shape information of a plurality of blood vessels having different blood vessel depths, it is preferable to use the violet light V, the blue light B, the green light G, and the red light R as the special light. In this case, in a case where the second emission pattern is set to the second A emission pattern (the number of frames of the special illumination period: same, and the emission spectrum of the special light: same) or the second C emission pattern (the number of frames of the special illumination period: different, and the emission spectrum of the special light: same), it is preferable to use any one of the violet light V, the blue light B, the green light G, and the red light R. On the other hand, in a case where the second emission pattern is set to the second B emission pattern (the number of frames of the special illumination period: same, and the emission spectrum of the special light: different) or the second D emission pattern (the number of frames of the special illumination period: different, and the emission spectrum of the special light: different), it is preferable to emit light of at least two of the violet light V, the blue light B, the green light G, or the red light R in a switched manner in a specific order in the special illumination period.

The first and second emission patterns that are switching patterns between the normal illumination period and the special illumination period are determined based on an image pick-up control of an image pick-up sensor 44 by an image pick-up processor 45 and thus, will be described in detail later. In addition, a frame refers to a unit of a period including at least a period from a specific timing to completion of signal readout in the image pick-up sensor 44.

For example, in a case of acquiring shape information of blood vessels related to a skin layer blood vessel of which a depth from a mucous membrane surface is within a range of 50 µm, a middle layer blood vessel of which a depth from the mucous membrane surface is within a range of 200 µm, and a deep layer blood vessel of which a depth from the mucous membrane surface is within a range of 600 µm, and performing the analysis processing based on the shape information of the surface layer, middle layer, and deep layer blood vessels, it is preferable to use the violet light V that highlights the surface layer blood vessel, the green light G that highlights the middle layer blood vessel, and the red light R that highlights the deep layer blood vessel.

In the present specification, the light quantity ratio includes a case where a ratio of at least one semiconductor light source is 0 (zero). Accordingly, a case where any one or two or more of the semiconductor light sources are not turned on is included. For example, the light quantity ratio is present even in a case of turning on only one semiconductor light source and not turning on the other three as in a case where the light quantity ratio among the violet light V, the blue light B, the green light G, and the red light R is 1:0:0:0.

As illustrated in FIG. 2, light emitted by each of the LEDs 20a to 20d is incident on a light guide 25 through an optical path coupling unit 23 composed of a mirror or a lens. The light guide 25 is incorporated in the endoscope 12 and a universal cord (a cord connecting the endoscope 12 to the light source device 14 and the processor device 16). The light guide 25 transmits light from the optical path coupling unit 23 to the distal end 12d of the endoscope 12.

An illumination optical system 30a and an image pick-up optical system 30b are provided in the distal end 12d of the endoscope 12. The illumination optical system 30a includes an illumination lens 32, and the observation target is irradiated with the illumination light transmitted by the light guide 25 through the illumination lens 32. The image pick-up optical system 30b includes an objective lens 42 and the image pick-up sensor 44. Light from the observation target by irradiating the observation target with the illumination light is incident on the image pick-up sensor 44 through the objective lens 42 and a zoom lens 43. Accordingly, an image of the observation target is formed on the image pick-up sensor 44. The zoom lens 43 is a lens for enlarging the observation target and is moved between a telephoto end and a wide end by operating the zoom operation part 13d.

Figures 9, 10:
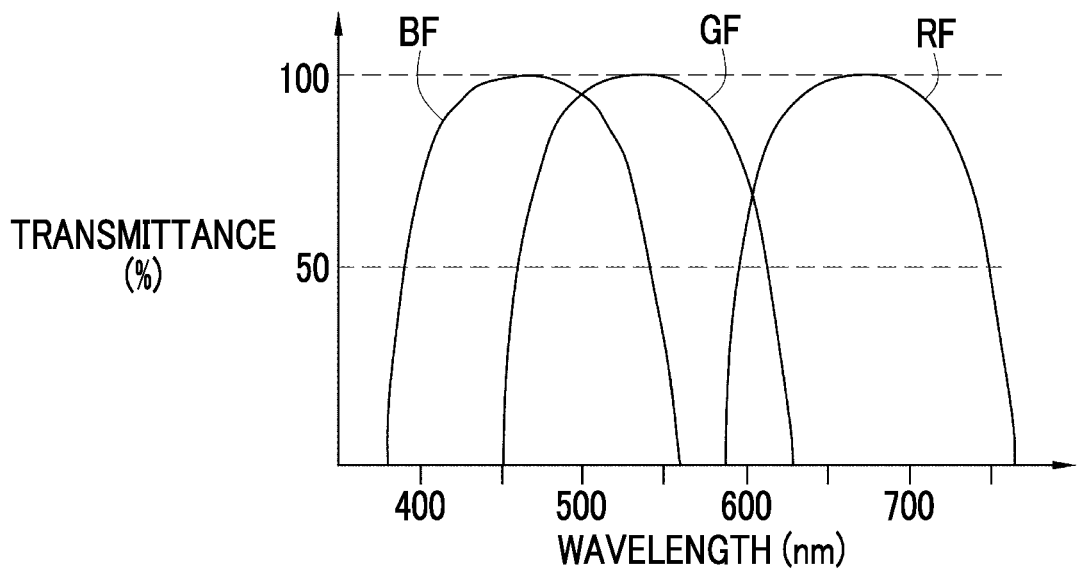
FIG. 9 is a graph illustrating a spectroscopic transmittance of each color filter of an image pick-up sensor.
FIG. 10 is a description diagram illustrating a normal image pick-up period and a special image pick-up period.

The image pick-up sensor 44 is a color sensor of a primary color system and comprises three types of pixels of a blue pixel (B pixel) including a blue color filter, a green pixel (G pixel) having a green color filter, and a red pixel (R pixel) having a red color filter. As illustrated in FIG. 9, light having a blue wavelength range, specifically, light having a wavelength range of 380 to 560 nm, is mainly transmitted through a blue color filter BF. Transmittance of the blue color filter BF has a peak near a wavelength of 460 to 470 nm. Light having a green wavelength range, specifically, light having a wavelength range of 460 to 620 nm, is mainly transmitted through a green color filter GF. Light having a red wavelength range, specifically, light having a wavelength of 580 to 760 nm, is mainly transmitted through a red color filter RF.

In addition, it is preferable that the image pick-up sensor 44 is a charge-coupled device (CCD) or a complementary metal oxide semiconductor (CMOS). The image pick-up processor 45 controls the image pick-up sensor 44. Specifically, a color image signal is output from the image pick-up sensor 44 by performing signal readout from the image pick-up sensor 44 by the image pick-up processor 45. In the normal observation mode, a Bc image signal, a Gc image signal, and a Rc image signal are output from the B pixel, the G pixel, and the R pixel of the image pick-up sensor 44, respectively, by performing the signal readout by the image pick-up processor 45 in a state where the image pick-up sensor 44 is exposed to the normal light. In the special observation mode, a Bs image signal, a Gs image signal, and a Rs image signal are output from the B pixel, the G pixel, and the R pixel of the image pick-up sensor 44, respectively, by performing the signal readout by the image pick-up processor 45 in a state where the image pick-up sensor 44 is exposed to the special light.

In the alert mode, as illustrated in FIG. 10, the image pick-up processor 45 outputs the normal image signal from the image pick-up sensor 44 by performing the signal readout in a state where the image pick-up sensor 44 is exposed to the normal light in the normal illumination period. A period in which the normal image signal is output will be referred to as a normal image pick-up period. The normal image signal includes a B1 image signal output from the B pixel, a G1 image signal output from the G pixel, and a R1 image signal output from the R pixel. In addition, the image pick-up processor 45 outputs the special image signal from the image pick-up sensor 44 by performing the signal readout in a state where the image pick-up sensor 44 is exposed to the special light in the special illumination period. A period in which the special image signal is output will be referred to as a special image pick-up period. The special image signal includes a B2 image signal output from the B pixel, a G2 image signal output from the G pixel, and a R2 image signal output from the R pixel.

As illustrated in FIG. 2, a correlated double sampling/automatic gain control (CDS/AGC) circuit 46 performs correlated double sampling (CDS) or an automatic gain control (AGC) on an analog color image signal obtained from the image pick-up sensor 44. The image signal that has passed through the CDS/AGC circuit 46 is transformed into a digital color image signal by an analog/digital (A/D) converter 48 and is input into the processor device 16.

In the processor device 16, a program related to processing such as image processing is stored in a program memory (not illustrated). In the processor device 16, functions of an image signal acquisition unit 50, a digital signal processor (DSP) 52, a noise reduction unit 54, an image processing switching unit 56, an image processing unit 58, and a display control unit 60 are implemented by operating the program in the program memory by a central control unit 68 composed of an image control processor. In addition, functions of a normal observation image generation unit 62, a special observation image generation unit 64, and an analysis processing unit 66 are implemented by implementing the function of the image processing unit 58.

The image signal acquisition unit 50 acquires the color image signal input from the endoscope 12. The color image signal includes a blue signal (B image signal), a green signal (G image signal), and a red signal (R image signal) output from the B pixel, the G pixel, and the R pixel of the image pick-up sensor 44. The acquired color image signal is transmitted to the DSP 52. In the DSP 52, various types of signal processing such as defect correction processing, offset processing, gain correction processing, matrix processing, gamma transformation processing, demosaicing processing, and YC transformation processing are performed on the received color image signal.

The DSP 52 outputs various signals after the YC transformation processing to the noise reduction unit 54, and the color image signal in which noise is reduced by the noise reduction unit 54 is input into the image processing switching unit 56.

The image processing switching unit 56 switches a transmission destination of the color image signal from the noise reduction unit 54 in accordance with the observation mode set by the mode selector switch 13*c*. Specifically, in a case where the normal observation mode is set, the color image signal is input into the normal observation image generation unit 62. In a case where the special observation mode is set, the color image signal is input into the special observation image generation unit 64. In a case where the alert mode is set, the color image signal is input into the analysis processing unit 66.

The normal observation image generation unit 62 performs image processing for the normal observation image on the input Rc image signal, Gc image signal, and Bc image signal of one frame. The image processing for the normal observation image includes color transformation processing such as 3×3 matrix processing, gradation transformation processing, and three-dimensional look up table (LUT) processing and structure highlighting processing such as color highlighting processing and spatial frequency highlighting. The Rc image signal, the Gc image signal, and the Bc image signal on which the image processing for the normal observation image is performed are transmitted to the display control unit 60 as the normal observation image.

The special observation image generation unit 64 performs image processing for the special observation image on the input Rs image signal, Gs image signal, and Bs image signal of one frame. The image processing for the special observation image includes color transformation processing such as 3×3 matrix processing, gradation transformation processing, and three-dimensional look up table (LUT) processing and structure highlighting processing such as color highlighting processing and spatial frequency highlighting. The Rs image signal, the Gs image signal, and the Bs image signal on which the image processing for the special observation image is performed are transmitted to the display control unit 60 as the special observation image.

The input R1 image signal, G1 image signal, and B1 image signal of one frame are subjected to the same image processing for the normal observation image as above and are transmitted to the display control unit 60 as the observation image by the analysis processing unit 66.

In addition, the analysis processing unit 66 performs the analysis processing on the input R2 image signal, G2 image signal, and B2 image signal of a specific frame and transmits the acquired analysis result to the display control unit 60. The acquired analysis result is used for detecting the lesion candidate region. The input R2 image signal, G2 image signal, and B2 image signal of the specific frame are not used for displaying a screen.

The display control unit 60 performs a control for displaying the input image signal on the display 18. Specifically, the display control unit 60 transforms the normal observation image, the special observation image, the observation image, or the observation image with the analysis result into a video signal that can be displayed in full color on the display 18. The transformed video signal is input into the display 18. The observation image is combined with the analysis result. Accordingly, the normal observation image, the special observation image, the observation image, or the observation image with the analysis result is displayed on the display 18.

A display control in the alert mode includes a display control at a time of nonoccurrence of missing in which the observation image is displayed on the display 18 in a case where missing of the lesion candidate region does not occur, and a display control at a time of occurrence of missing in which not only the observation image but also an image related to the lesion candidate region are displayed on the display 18 when missing of the lesion candidate region occurs.

Figure 11:
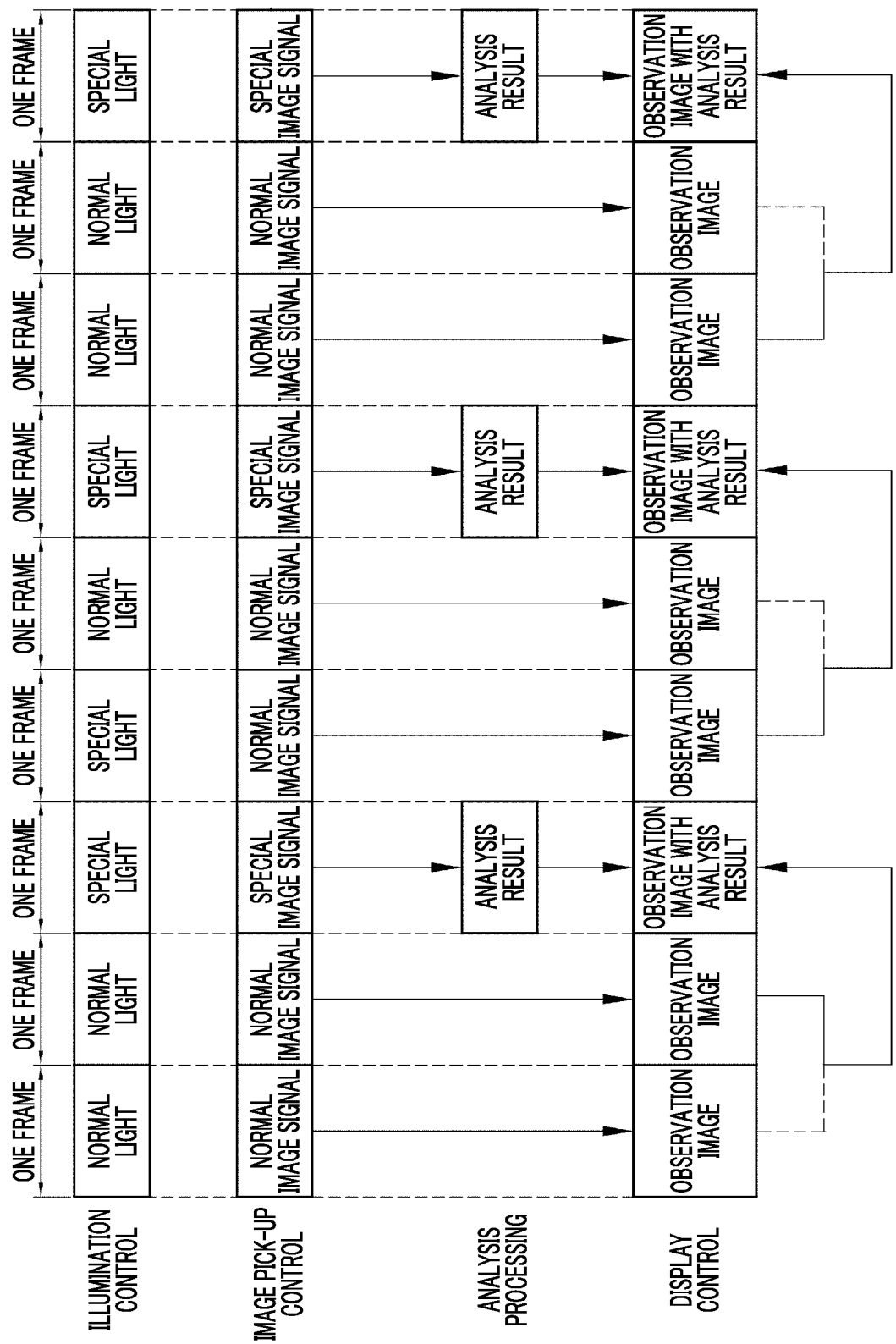
FIG. 11 is a description diagram illustrating an illumination control, analysis processing, and image display at the time of the alert mode in a time series order.

In the display control at the time of nonoccurrence of missing in the alert mode, as illustrated in FIG. 11, for example, in a case where the first emission pattern is set to the first A emission pattern and the second emission pattern is set to the second A emission pattern (the number of frames of the special illumination period: same, and the emission spectrum of the special light: same), and the observation target is illuminated with the normal light for two frames and with the special light for one frame between each emission of the normal light, the normal image signal obtained by illumination with the normal light is subjected to the image processing for the normal observation image and is input into the display control unit 60 as the observation image.

On the other hand, the analysis result is obtained by performing the analysis processing on the special image signal obtained by illumination with the special light. The analysis result is transmitted to the display control unit 60, and the observation image with the analysis result is obtained by combining each single analysis result with the observation image. The observation image with the analysis result of one frame based on the observation image of two frames and the analysis result is displayed after the observation image of two frames is displayed. The observation image used in the observation image with the analysis result is an observation image having less blurriness.

Examples of the analysis processing of the special image signal include blood vessel extraction processing of extracting the shape information of the blood vessels and index value calculation processing of calculating an index value related to the blood vessels.

Figure 12:
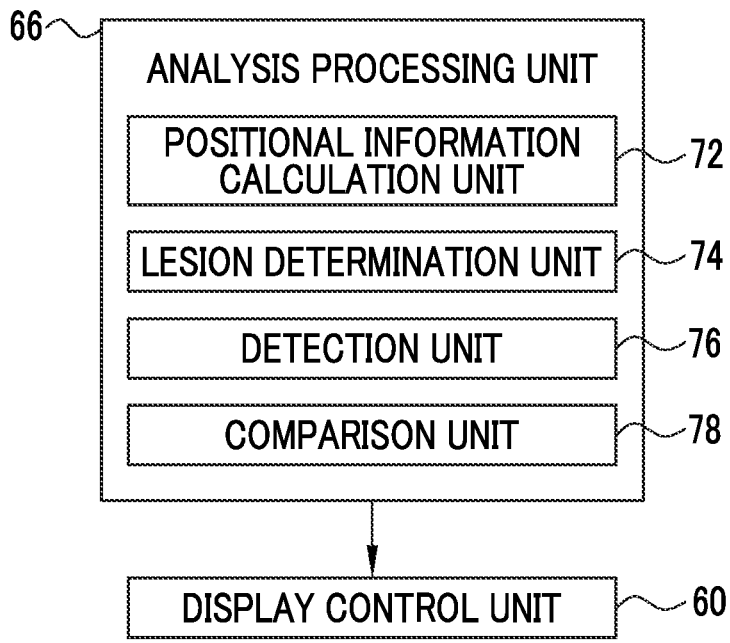
FIG. 12 is a block diagram illustrating functions of an analysis processing unit.

As illustrated in FIG. 12, the analysis processing unit 66 comprises a positional information calculation unit 72, a lesion determination unit 74, a detection unit 76, and a comparison unit 78.

Figure 13:
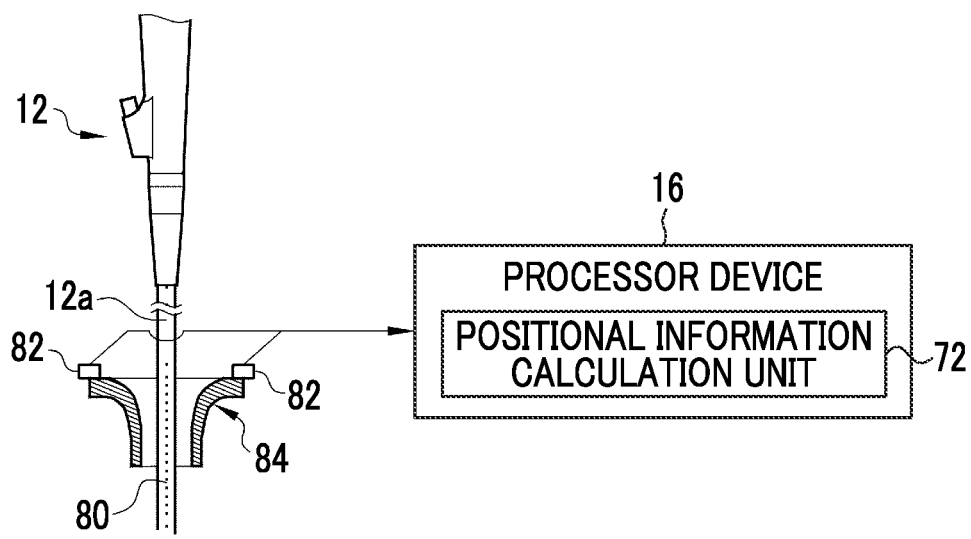
FIG. 13 is a description diagram illustrating a method of calculating positional information of an endoscope distal end part.

The positional information calculation unit 72 calculates positional information of the distal end 12d inside a lumen based on a result of a scale detection sensor 82. As illustrated in FIG. 13, a measurement scale 80 for measuring an insertion length of the insertion part 12a inside a body is provided on an outer peripheral surface of the insertion part 12a of the endoscope 12. The measurement scale 80 is composed of points provided at a predetermined pitch (for example, an interval of 1 cm) along a longitudinal direction of the insertion part 12a. The measurement scale 80 is detected by the scale detection sensor 82 provided in a mouth (in a case of upper endoscopy) or an anus (in a case of lower endoscopy) of a patient, and a detection result is transmitted to the positional information calculation unit 72 of the processor device 16. In the illustration of FIG. 13, the scale detection sensor 82 is provided in a mouthpiece 84 that the patient holds in the mouth.

The lesion determination unit 74 automatically determines whether or not the lesion candidate region is present with respect to the analysis result obtained from the special image signal of at least one of the B2 image signal, the G2 image signal, or the R2 image signal.

The detection unit 76 detects the positional information and the lesion candidate image at a point in time when the lesion determination unit 74 determines that the lesion candidate region is present, and performs the automatic capture. A captured image acquisition instruction is issued by the automatic capture, and the storage control of the image is performed. Instead of the automatic capture, a manual capture can also be performed by operating the captured image acquisition instruction unit 13b. The lesion candidate image and the positional information include the first lesion candidate image and first positional information obtained at the time of the first observation and a second lesion candidate image and second positional information obtained at the time of the second observation different from the time of the first observation. An operation of switching between the time of the first observation and the time of the second observation is performed by the positional information switching unit 13e.

The comparison unit 78 performs positional information comparison processing between the first positional information and the second positional information obtained by the automatic capture and, in a case where the first positional information and the second positional information match, performs image comparison processing between the first lesion candidate image and the second lesion candidate image and determines whether or not the lesion candidate region is missing as a result of the image comparison processing. A result of the comparison processing is transmitted to the display control unit 60.

In a case where a determination that the lesion candidate region is missing is made based on the result of the comparison processing in the comparison unit 78, the display control unit 60 automatically newly displays the subscreen 18b (refer to FIG. 16) on the display 18 and automatically displays the first lesion candidate image stored in the captured image storage memory 70 on the subscreen 18b. Details of the automatic display of the first lesion candidate image will be described later.

Figures 14, 15:
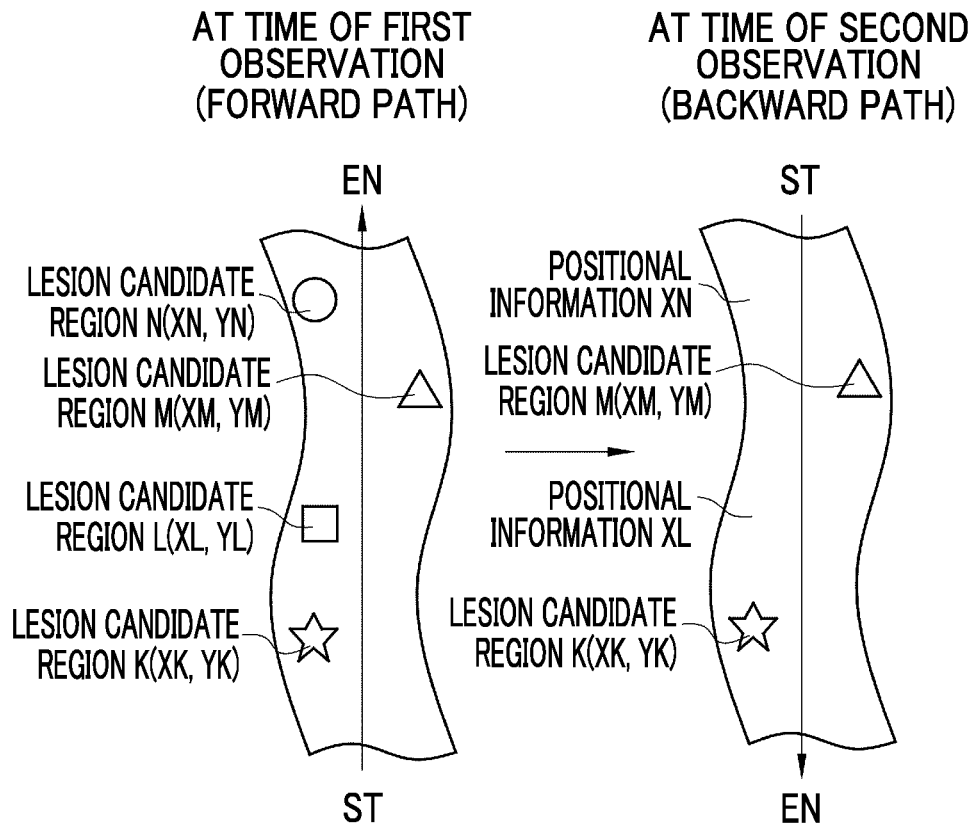
FIG. 14 is a description diagram illustrating a specific example in detecting the positional information and a lesion candidate image.
FIG. 15 is a table showing determinations based on results of positional information comparison processing and image comparison processing.

The display control at the time of occurrence of missing in the alert mode will be described using the case illustrated in FIG. 14 as an example. In a case where the insertion part 12a of the endoscope 12 moves forward and backward on the same path inside the lumen of a stomach, an esophagus, an intestine, or the like, a forward path is used at the time of the first observation, and a backward path is used at the time of the second observation. At the time of the first observation on the forward path, the "first observation" is set by the positional information switching unit 13e. At the time of the first observation on the forward path, for example, four first lesion candidate images of a lesion candidate region K, a lesion candidate region L, a lesion candidate region M, and a lesion candidate region N and the first positional information are acquired and stored in the captured image storage memory 70 by the detection unit 76. Here, first positional information XK and a first lesion candidate image YK are detected as the lesion candidate region K. First positional information XL and a first lesion candidate image YL are detected as the lesion candidate region L. First positional information XM and a first lesion candidate image YM are detected as the lesion candidate region M. First positional information XN and a first lesion candidate image YN are detected as the lesion candidate region N. In FIG. 14, "ST" denotes an insertion opening inside the lumen of a gastrointestinal tract or the like, and "EN" denotes an end position of an observable range inside the lumen.

After the distal end 12d of the insertion part 12a reaches the end position of the observable range of the forward path, the setting is switched to the "second observation" by operating the positional information switching unit 13e, and the second observation is performed. At the time of the second observation on the backward path, the insertion part 12a is returned along the same path as the forward path.

The positional information comparison processing and the image comparison processing will be described. As illustrated in FIG. 15, for example, in a case where second positional information XM is acquired at the time of the second observation on the backward path, and a second lesion candidate image YM is detected at the position, the comparison processing results in matching between the first positional information XM and the second positional information XM and matching between the first lesion candidate image YM and the second lesion candidate image YM. In this case, the comparison unit 78 determines that the "lesion candidate region is not missing". Similarly, even in a case where second positional information XK is acquired at the time of the second observation on the backward path, and a second lesion candidate image YK is detected at the position, the comparison unit 78 determines that the "lesion candidate region is not missing".

On the other hand, in a case where second positional information XN is acquired at the time of the second observation on the backward path, and a second lesion candidate image YN of the lesion candidate region N is not detected at the position, the comparison processing results in matching between the positional information and non-matching between the lesion candidate images. In this case, the lesion candidate region N detected at the time of the first observation is missing at the time of the second observation. Thus, the comparison unit 78 determines that the "lesion candidate region is missing". In addition, in a case where second positional information XL is acquired at the time of the second observation on the backward path, and a second lesion candidate image YL of the lesion candidate region L is not detected at the position, the lesion candidate region L detected at the time of the first observation is missing at the time of the second observation. Thus, the comparison unit 78 determines that the "lesion candidate region is missing".

Figure 16:
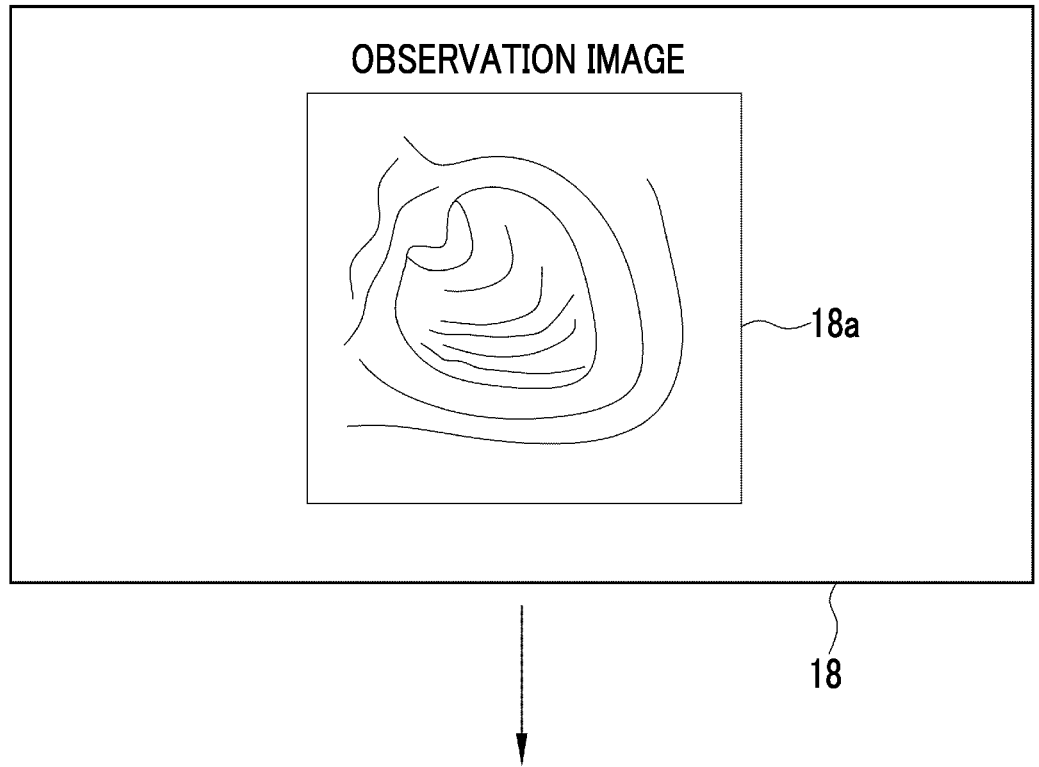
FIG. 16 is an image diagram of one display on which a missing prevention alert of a first embodiment is performed.
Figure 16:
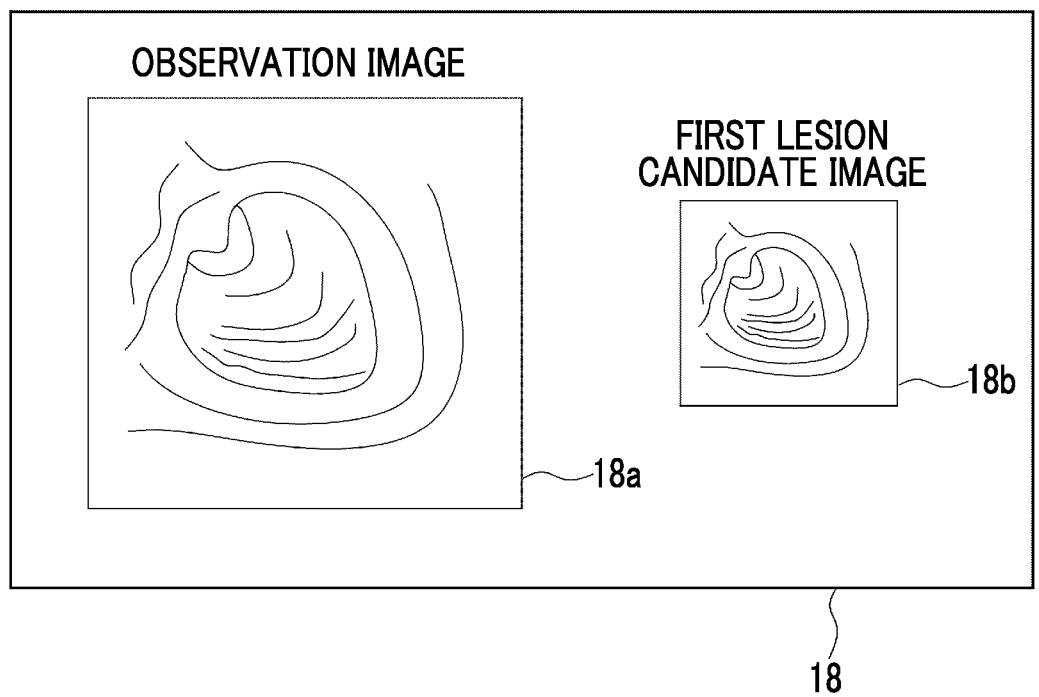

A missing prevention alert is performed by screen display based on the result of the comparison processing between the time of the first observation and the time of the second observation. As illustrated in FIG. 16, in displaying the observation image (or the observation image with the analysis result) on the main screen 18a of the display 18, in a case where the determination that the "lesion candidate region is missing" is made, the subscreen 18b provided at a different position from the main screen 18a is automatically displayed. The first lesion candidate image stored in the captured image storage memory 70 is automatically displayed on the displayed subscreen 18b. For example, in a case where a determination that the lesion candidate region N (refer to FIG. 14) is missing at the second positional information XN is made, the first lesion candidate image YN is displayed on the subscreen 18b. Accordingly, presence of the lesion candidate region at the time of the second observation is recalled, and the missing prevention alert is performed.

In FIG. 16, the observation image is displayed on the main screen 18a, and the first lesion candidate image is displayed on the subscreen 18b. Conversely, the first lesion candidate image may be displayed on the main screen 18a, and the observation image may be displayed on the subscreen 18b. In addition, while only one first lesion candidate image is displayed, the present invention is not limited thereto, and two or more first lesion candidate images may be displayed. While the main screen 18a and the subscreen 18b are displayed on one display 18, the main screen 18a may be displayed on a plurality of displays, and the subscreen 18b may be displayed on the remaining display 18. For example, in a case of using two displays 18, only the observation image may be displayed on the entire screen of the first display 18, and only information related to the first lesion candidate image and the lesion candidate region may be displayed on the second display 18.

Figure 17:
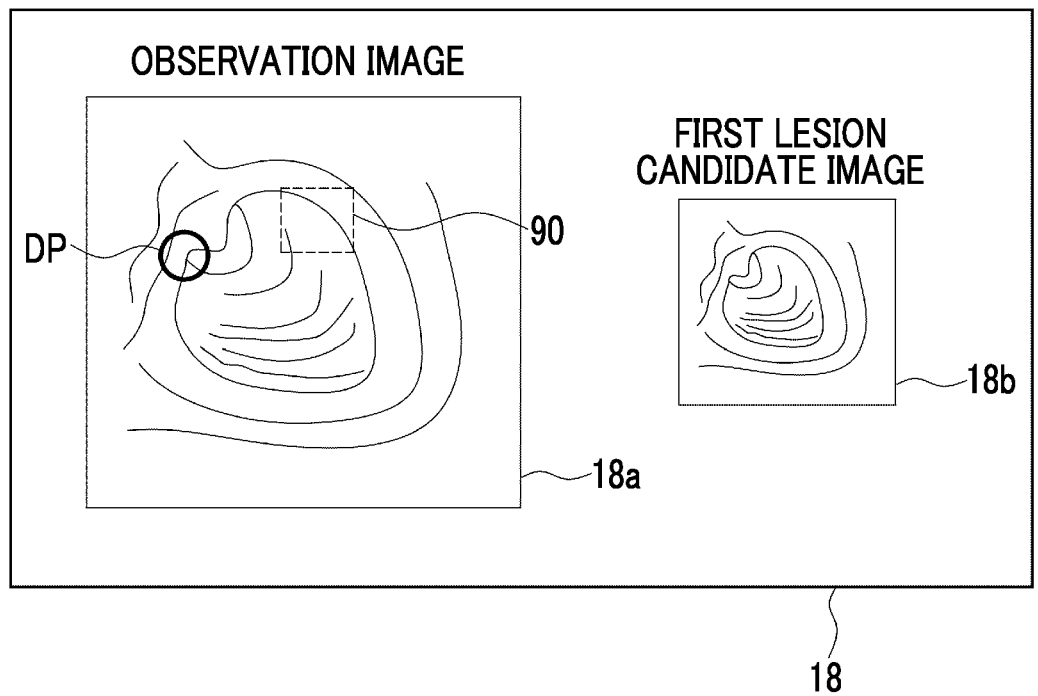
FIG. 17 is an image diagram of display of the positional information of a lesion candidate region in an observation image.

As in FIG. 17, in a case where the determination that the "lesion candidate region is missing" is made, it is preferable that the display control unit 60 displays positional information DP of the missing lesion candidate region on the main screen 18a. It is preferable that the positional information DP of the lesion candidate region is calculated from the first positional information, the second positional information, or the like. For example, in a case where a determination that the lesion candidate region N (refer to FIG. 14) is missing at the second positional information XN is made, the positional information DP of the lesion candidate region is calculated based on the second positional information XN, and the calculated positional information DP is displayed on the main screen 18a. Accordingly, it is preferable to display a quadrangle (□), a circle (○), an arrow, or the like as an indicator at the positional information DP at which the user can recognize a position of the lesion candidate region. In FIG. 17, a circle (○) is displayed as the indicator. In a case where the lesion candidate region that is detected is present at the time of the second observation without missing, it is preferable to display the indicator on the main screen 18a as a detected lesion candidate region. In FIG. 17, the indicator is displayed as a rectangular region 90 of a dotted line.

In addition, not only the display using the indicator may be performed on the image, but also even at a time of motion picture display, the lesion candidate region may be automatically tracked during movement based on an image feature of the lesion candidate region detected once, and display may be performed in accordance with the automatic tracking.

Figure 18:
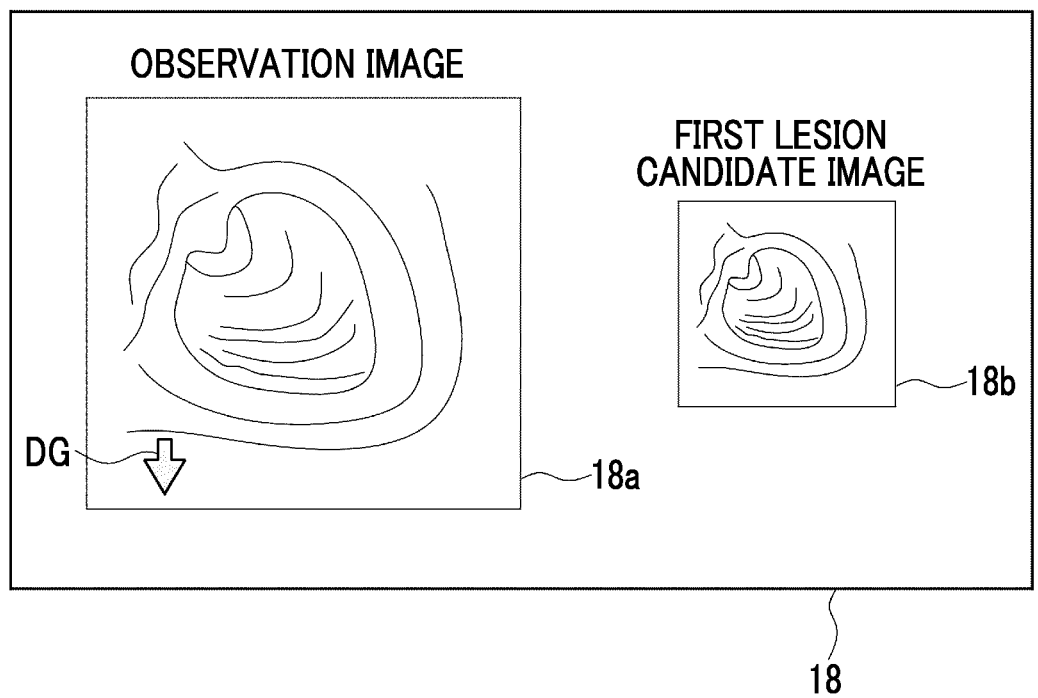
FIG. 18 is an image diagram of display of a guide for the lesion candidate region in the observation image.

In addition, in a case where the determination that the "lesion candidate region is missing" is made, it is preferable that the display control unit 60 displays a guide DG indicating a direction of the lesion candidate region on the main screen 18a as illustrated in FIG. 18. It is preferable to display the guide DG in a case where the lesion candidate region is not displayed on the main screen 18a. In addition, it is preferable to decide the guide DG from the first positional information, the second positional information, or the like. For example, in a case where the determination that the lesion candidate region N (refer to FIG. 14) is missing at the second positional information XN is made, the guide DG indicating the direction of the lesion candidate region is decided based on the second positional information XN, and the calculated guide DG is displayed on the main screen 18a.

In the embodiment, assuming a case where the distal end 12d of the endoscope 12 is moved forward and backward along inside the lumen of the stomach, the intestine, the esophagus, or the like in lesion diagnosis performed once, the forward path is used at the time of the first observation, and the backward path that returns on the same path as the forward path is used at the time of the second observation. The time of the first observation and the time of the second observation are not limited to the forward path and the backward path in the lesion diagnosis performed once and can also be applied to other cases as long as the time of the second observation is a timing subsequent in time to the time of the first observation and the lesion candidate region is detected on the same path between the time of the first observation and the time of the second observation. For example, the time of the first observation and the time of the second observation can also be applied to a case of performing the lesion diagnosis over days. In this case, it is considered that a first diagnosis day such as initial diagnosis is the time of the first observation and a second diagnosis day such as follow-up observation after the first diagnosis day is the time of the second observation. In this case, it is preferable to automatically switch from the "first observation" to the "second observation" without operating the positional information switching unit 13e.

In the present embodiment, while a determination as to whether or not the lesion candidate region is missing between the time of the first observation and the time of the second observation is performed using both of the positional information and the lesion candidate image, missing of the lesion candidate region may be determined using only the lesion candidate image. In this case, the comparison processing between the first lesion candidate image and the second lesion candidate image is performed, and missing of the lesion candidate region is determined in accordance with the result of the comparison processing.

The following storage control is performed for the image at the time of the first observation. In the alert mode, in the automatic capture, the captured image acquisition instruction is issued, and the first lesion candidate image obtained from a plurality of frames in the normal image pick-up period and the analysis result acquired from the special image signal in the special image pick-up period are acquired. The acquired first lesion candidate image and the first positional information are associated with each other and stored in the captured image storage memory 70.

For example, in a case where the first emission pattern is set to the first A emission pattern and the second emission pattern is set to the second A emission pattern (the number of frames of the special illumination period: same, and the emission spectrum of the special light: same), and the captured image acquisition instruction is provided, an image signal acquisition period of the normal light is set to all frames of the nearest normal image pick-up period including a frame of a timing at which the captured image acquisition instruction is provided. In addition, even in the special image pick-up period, the special image signal is acquired in a frame nearest to the timing at which the captured image acquisition instruction is provided. The analysis result acquired from the special image signal is stored in the captured image storage memory 70.

On the other hand, in a case where the first emission pattern is set to the first A emission pattern and the second emission pattern is set to the second B emission pattern (the number of frames of the special illumination period: same, and the emission spectrum of the special light: different), and the captured image acquisition instruction is provided, the image signal acquisition period of the normal light is set to all frames of the nearest normal image pick-up period including the frame of the timing at which the captured image acquisition instruction is provided. In addition, even in the special image pick-up period, not only the frame nearest to the timing at which the captured image acquisition instruction is provided but also frames of the nearest special image pick-up period corresponding to all of the remaining types of emission spectra are included. For example, in a case where the special light is the violet light V, the green light G, and the red light G, and the captured image acquisition instruction is provided in the special image pick-up period of the violet light V, the image signal acquisition period includes not only a frame of the special image pick-up period corresponding to the violet light V but also a frame of the special image pick-up period corresponding to the green light G and a frame of the special image pick-up period corresponding to the red light R. Accordingly, by providing the captured image acquisition instruction, the special image signal corresponding to the violet light V, the special image signal corresponding to the green light G, and the special image signal corresponding to the red light R are acquired and stored in the captured image storage memory 70.

Figure 19:
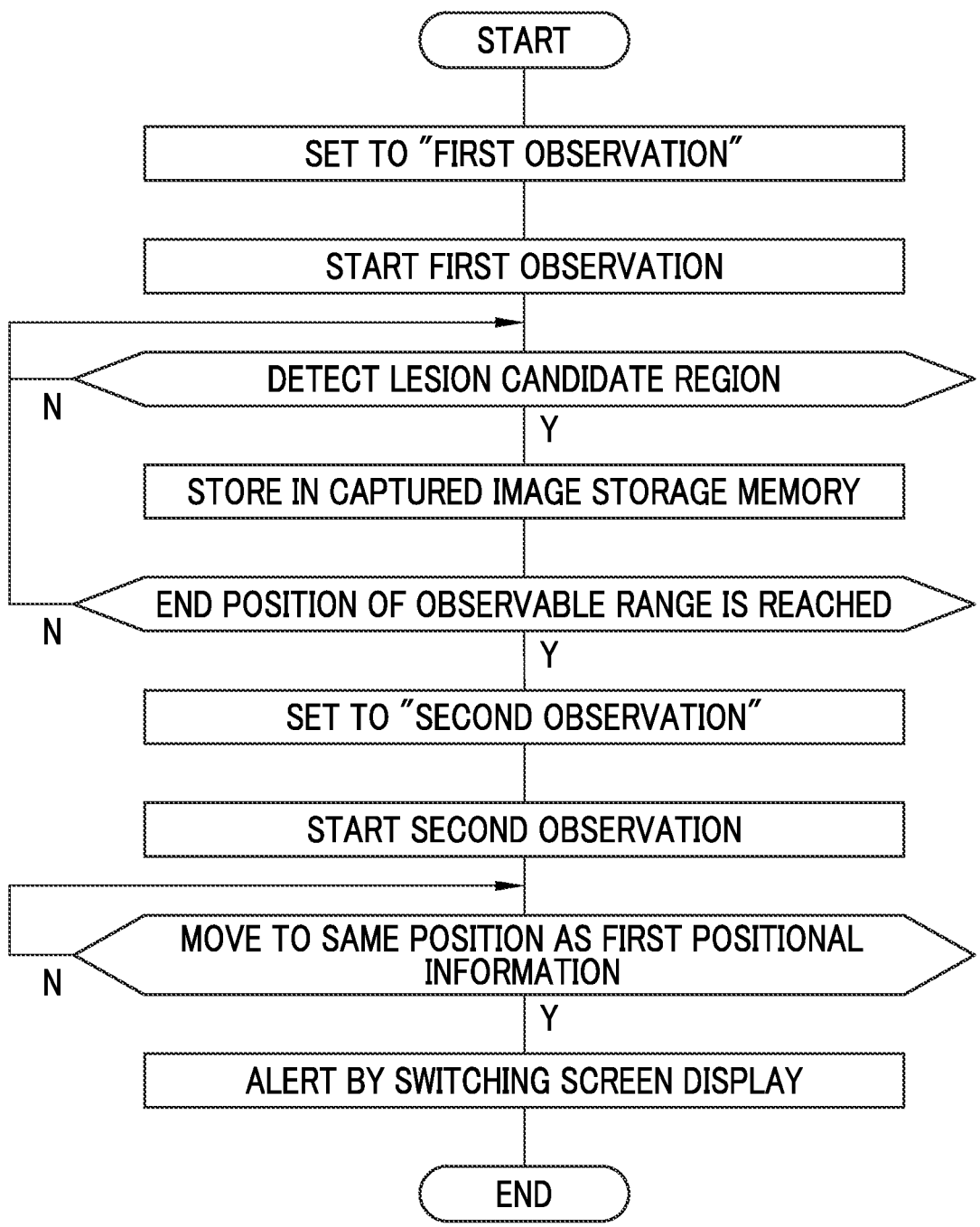
FIG. 19 is a flowchart illustrating a series of flows of the alert mode.

A series of flows of the missing prevention alert in the alert mode will be described along the flowchart in FIG. 19. First, the observation mode is switched to the "alert mode" by operating the mode selector switch 13c, and the setting is switched to the "first observation" by operating the positional information switching unit 13e. In a case where the observation mode is switched to the alert mode, switching between the first emission pattern for emitting the normal light and the second emission pattern for emitting the special light is automatically performed. The normal light and the special light are automatically alternately emitted between the first and second emission patterns, and the observation target is illuminated with the normal light and the special light. The first observation is performed by inserting the distal end 12d of the endoscope 12 into the lumen and moving the distal end 12d from the insertion opening to the end position of the observable range.

In the first observation, in a case where the detection unit 76 detects the first lesion candidate image, the automatic capture of automatically capturing the first lesion candidate image in association with the first positional information at the point in time is performed. The first lesion candidate image and the first positional information obtained by the automatic capture are stored in the captured image storage memory 70.

After the distal end 12d of the endoscope 12 reaches the end position of the observable range of the lumen, the setting is switched to the "second observation" by operating the positional information switching unit 13e, and the second observation is started. At the time of the second observation, the second lesion candidate image is detected by moving the distal end 12d of the endoscope 12 from the end position of the observable range to the insertion opening such that the distal end 12d returns on the same path as at the time of the first observation.

In the second observation, in a case where the detection unit 76 detects the second lesion candidate image, the automatic capture of automatically capturing the second lesion candidate image in association with the second positional information at the point in time is performed. In a case where the automatic capture is performed, the comparison unit 78 performs the positional information comparison processing between the first positional information stored in the captured image storage memory 70 and the second positional information obtained by the automatic capture at the time of the second observation. In a case where the first positional information and the second positional information match as a result of the positional information comparison processing, the image comparison processing between the first lesion candidate image associated with the first positional information and the second lesion candidate image obtained by the automatic capture is performed.

In a case where the first lesion candidate image and the second lesion candidate image do not match and the determination that the "lesion candidate region is missing" is made as a result of the image comparison processing, the subscreen 18b is automatically newly displayed on the display 18. The first lesion candidate image associated with the first positional information is automatically displayed on the subscreen 18b. Accordingly, presence of the lesion candidate region at the time of the second observation is recalled, and the missing prevention alert is performed.

Second Embodiment

Figure 20:
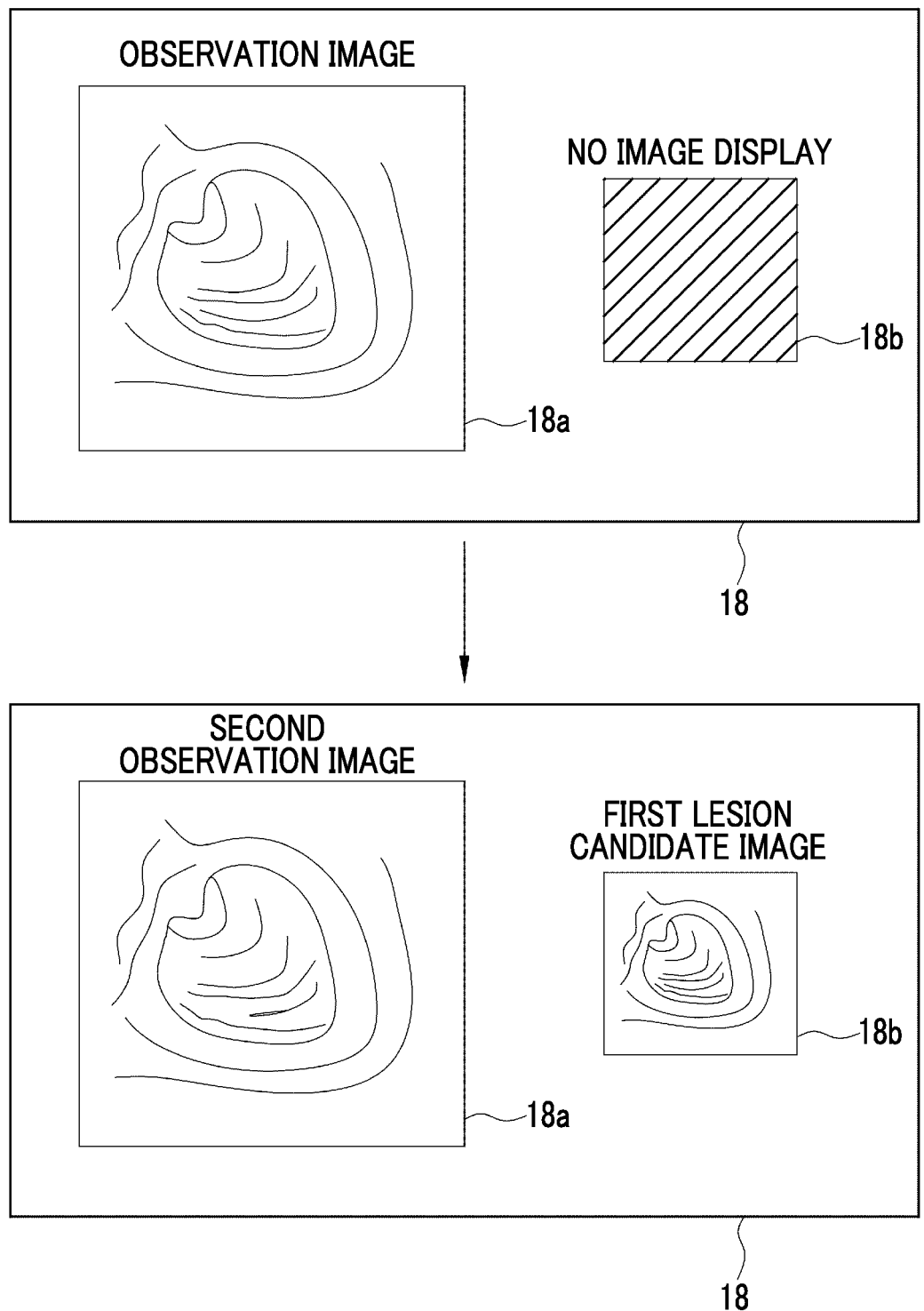
FIG. 20 is an image diagram of one display on which a missing prevention alert of a second embodiment is performed.

As illustrated in FIG. 20, in an endoscope system of a second embodiment, the main screen 18a and the subscreen 18b are displayed side by side on the display 18 from when observation starts. Hereinafter, only parts different from the first embodiment will be described, and the same parts as the first embodiment will not be described.

At the time of the second observation in the alert mode, in a case where the determination that the "lesion candidate region is missing" is made, the first lesion candidate image for which the determination that the "lesion candidate region is missing" is made is automatically displayed on the subscreen 18b provided at a different position from the main screen 18a. Accordingly, presence of the lesion candidate region at the time of the second observation is recalled, and the missing prevention alert is performed.

In addition, at the time of the first observation, each time the first lesion candidate image obtained by the automatic capture is acquired, the first lesion candidate image may be displayed on the subscreen 18b separately from the display for missing prevention. By displaying the first lesion candidate image on the subscreen 18b at the time of the first observation, missing at the same position at the time of the second observation can be further prevented. In this case, a plurality of the subscreens 18b may be provided on the display 18. In a case where the first lesion candidate image is newly acquired at the time of the first observation, the newly acquired first lesion candidate image may be displayed on the subscreen 18b different from the subscreen 18b on which the previously acquired first lesion candidate image is displayed.

Third Embodiment

Figure 21:
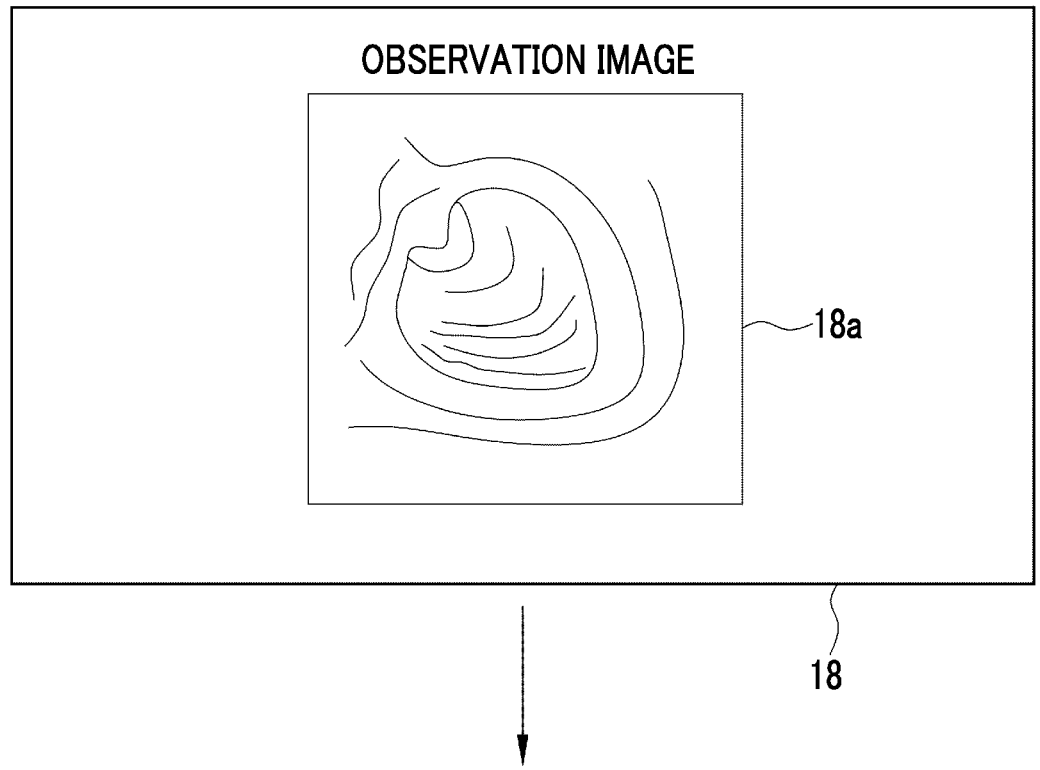
FIG. 21 is an image diagram of one display on which a missing prevention alert of a third embodiment is performed.
Figure 21:
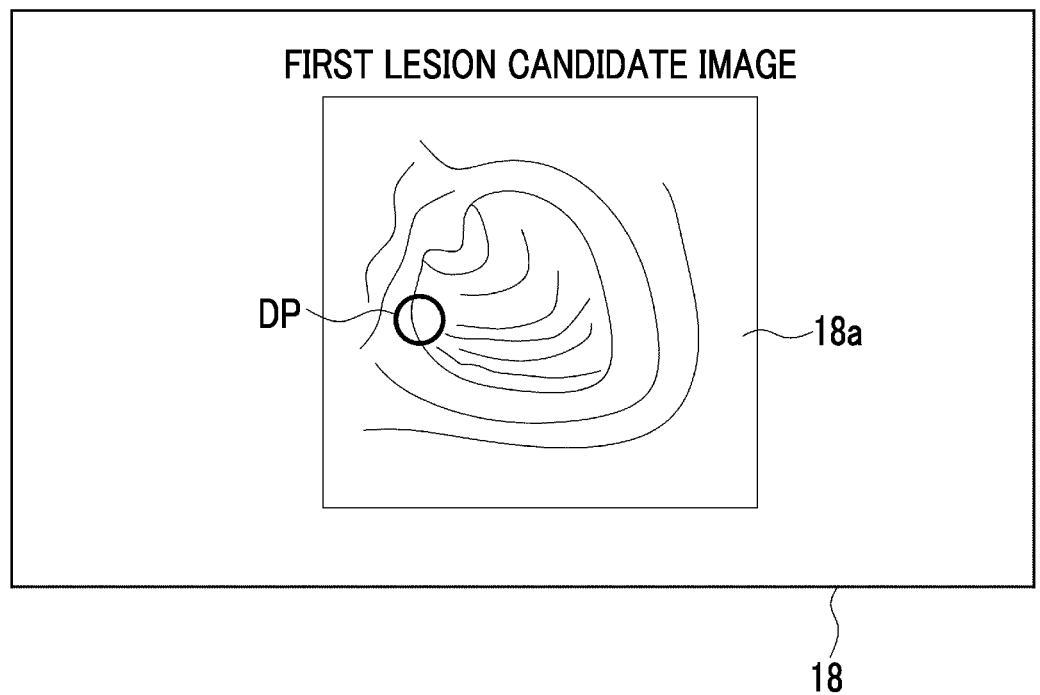

As illustrated in FIG. 21, in an endoscope system of a third embodiment, the display 18 does not display the subscreen 18b and displays only the main screen 18a. Hereinafter, only parts different from the first embodiment will be described, and the same parts as the first embodiment will not be described.

At the time of the second observation in the alert mode, normally, the observation image is displayed on the main screen 18a. In a case where the determination that the "lesion candidate region is missing" is made, display of the main screen 18a is automatically switched from the observation image to the first lesion candidate image for which the determination that the "lesion candidate region is missing" is made. As illustrated in FIG. 21, it is preferable to display the positional information DP of the missing lesion candidate region as the indicator on the first lesion candidate image after switching. A circle (o) of a thick line is displayed as the indicator.

In the third embodiment, the missing alert by switching display to the first lesion candidate image may be performed not only during observation but also after observation is finished. In this case, only the acquisition of the first and second lesion candidate images by the automatic capture is performed during observation, and the positional information comparison processing and the image comparison processing are not performed during observation. After observation is finished, the positional information comparison processing and the image comparison processing are performed by operating the user interface 19. In a case where the determination that the "lesion candidate region is missing" is made as a result of the image comparison processing, the display of the main screen 18a is switched to the first lesion candidate image for which the determination that the "lesion candidate region is missing" is made.

In each of the embodiments, while the normal image signal based on the normal light is used for the observation image and the special image signal based on the special light is used for only the analysis processing, the analysis processing may also be performed on the normal image signal to detect the lesion candidate image. In this case, the lesion candidate image based on the normal image signal and the lesion candidate image based on the special image signal are used in a switched manner. It is preferable that the detection or non-detection of the lesion candidate image based on the normal image signal can be appropriately set using the user interface 19.

In the embodiments, a hardware structure of a processing unit executing various types of processing of the image signal acquisition unit 50, the noise reduction unit 54, the image processing switching unit 56, the normal observation image generation unit 62, the special observation image generation unit 64, the analysis processing unit 66, the positional information calculation unit 72, the lesion determination unit 74, the detection unit 76, and the comparison unit 78 corresponds to the following various processors. The various processors include a central processing unit (CPU) that is a general-purpose processor functioning as various processing units by executing software (program), a graphical processing unit (GPU), a programmable logic device (PLD) that is a processor such as a field programmable gate array (FPGA) having a circuit configuration changeable after manufacturing, a dedicated electric circuit that is a processor having a circuit configuration dedicatedly designed to execute various types of processing, and the like.

One processing unit may be composed of one of the various processors or may be composed of a combination of two or more processors of the same type or different types (for example, a plurality of FPGAs, a combination of a plurality of a CPU and an FPGA, or a combination of a CPU and a GPU). In addition, a plurality of processing units may be composed of one processor. As an example in which the plurality of processing units are composed of one processor, first, as represented by a computer such as a client or a server, a form in which one processor is composed of a combination of one or more CPUs and software and the processor functions as the plurality of processing units is possible. Second, as represented by a system on chip (SoC) or the like, a form of using a processor that implements functions of the entire system including the plurality of processing units in one integrated circuit (IC) chip is possible. Accordingly, the various processing units are configured using one or more of the various processors as a hardware structure.

Furthermore, the hardware structure of the various processors is more specifically an electric circuit (circuitry) having a form in which circuit elements such as semiconductor elements are combined. In addition, a hardware structure of a storage unit is a storage device such as a hard disc drive (HDD) or a solid state drive (SSD).

The following is illustrated as another embodiment of the present invention. In claims 1 and 2, a condition of "times of first and second observation" and a condition of "positional information matching" are removed. That is, in a case where the lesion candidate image is detected, the automatic capture is performed, and subscreen display and the like are immediately performed.

The invention shown in Appendices 1 and 2 below can be perceived from the above description.

APPENDIX 1

An endoscope system comprising a display having a main screen on which an observation image is displayed, and an image control processor, in which the image control processor is configured to, in a case where a lesion candidate image is detected, perform an automatic capture of automatically storing the lesion candidate image in a captured image storage memory, automatically newly display a subscreen on the display, and immediately display the detected lesion candidate image on the subscreen.

APPENDIX 2

An endoscope system comprising a display having a main screen on which an observation image is displayed and a subscreen provided at a different position from the main screen, and an image control processor, in which the image control processor is configured to, in a case where a lesion candidate image is detected, perform an automatic capture of automatically storing the lesion candidate image in a captured image storage memory and immediately display the detected lesion candidate image on the subscreen.

EXPLANATION OF REFERENCES

10: endoscope system
12: endoscope
12a: insertion part
12b: operating part
12c: bendable part
12d: distal end
13a: angle knob
13b: captured image acquisition instruction unit
13c: mode selector switch
13d: zoom operation part
13e: positional information switching unit
14: light source device
16: processor device
18: display
18a: main screen
18b: subscreen
19: user interface
20: light source unit
20a: V-LED
20b: B-LED
20c: G-LED
20d: R-LED
21: light source processor
23: optical path coupling unit
25: light guide
30a: illumination optical system
30b: image pick-up optical system
32: illumination lens
42: objective lens
43: zoom lens
44: image pick-up sensor
45: image pick-up processor
46: CDS/AGC circuit
48: A/D converter
50: image signal acquisition unit
52: DSP
54: noise reduction unit
56: image processing switching unit
58: image processing unit
60: display control unit
62: normal observation image generation unit
64: special observation image generation unit
66: analysis processing unit
68: central control unit
70: captured image storage memory
72: positional information calculation unit
74: lesion determination unit
76: detection unit
78: comparison unit
80: measurement scale
82: scale detection sensor
84: mouthpiece
90: rectangular region of dotted line
BF: blue color filter
GF: green color filter
RF: red color filter
ST: observation start position
EN: observation end position
XK: positional information of lesion candidate region K
YK: lesion candidate image of lesion candidate region K
XL: positional information of lesion candidate region L
YL: lesion candidate image of lesion candidate region L
XM: positional information of lesion candidate region M
YM: lesion candidate image of lesion candidate region M
XN: positional information of lesion candidate region N
YN: lesion candidate image of lesion candidate region N
DP: positional information of lesion candidate region
DG: guide

What is claimed is:

1. An endoscope system comprising:
a display having a main screen on which an observation image is displayed, or having the main screen and a subscreen provided at a different position from the main screen; and
an image control processor,
wherein the image control processor is configured to:
in a case where a first lesion candidate image is detected at a time of first observation in which an endoscope insertion part moves from an insertion opening to an end position of an observable range inside a lumen, perform an automatic capture of automatically capturing the first lesion candidate image in association with first positional information and, in a case where a second lesion candidate image is detected at a time of second observation in which the endoscope insertion part moves from the end position of the observable range to the insertion opening inside the lumen, perform an automatic capture of automatically capturing the second lesion candidate image in association with second positional information;
store the first lesion candidate image and the first positional information obtained by the automatic capture in a captured image storage memory;
perform positional information comparison processing between the first positional information and the second positional information and, in a case where the first positional information and the second positional information match, perform image comparison processing between the first lesion candidate image and the second lesion candidate image; and
in a case where a determination that a lesion candidate region is missing is made as a result of the image comparison processing, execute one of following 1) to 3):
1) Automatically newly displaying a subscreen on the display and automatically display the first lesion candidate image stored in the captured image storage memory on the subscreen;
2) Automatically displaying the first lesion candidate image stored in the captured image storage memory on the subscreen of the display; or
3) automatically switching display of the main screen from the observation image to the first lesion candidate image stored in the captured image storage memory.

2. The endoscope system according to claim 1, wherein the image control processor is configured to, in a case where the determination that the lesion candidate region is missing is made, display positional information of the lesion candidate region on the main screen.

3. The endoscope system according to claim 1, wherein the image control processor is configured to, in a case where the determination that the lesion candidate region is missing is made, display a guide indicating a direction of the lesion candidate region on the main screen.

4. The endoscope system according to claim 1, further comprising:
a light source device that emits normal light and special light having different wavelength characteristics;
a light source processor configured to emit the normal light with a first emission pattern and emit the special light with a second emission pattern in a case of automatically switching between a normal illumination period in which the normal light is emitted and a special illumination period in which the special light is emitted; and
an image pick-up sensor that outputs a normal image signal obtained by picking up an image of an observation target illuminated with the normal light and a special image signal obtained by picking up an image of the observation target illuminated with the special light,
wherein the image control processor displays, on the display, an observation image with an analysis result displaying an analysis result obtained by performing analysis processing based on the special image signal, the analysis result being displayed on the observation image based on the normal image signal, and
performs the automatic capture in a case where the lesion candidate region is detected based on the analysis result.

5. The endoscope system according to claim 4, wherein the first emission pattern is any one of a first A emission pattern in which the number of frames of the normal illumination period is the same for each normal illumination period, and a first B emission pattern in which the number of frames of the normal illumination period is different for each normal illumination period.

6. The endoscope system according to claim 4, wherein the second emission pattern is any one of
a second A emission pattern in which the number of frames of the special illumination period is the same for each special illumination period and an emission spectrum of the special light is the same for each special illumination period,
a second B emission pattern in which the number of frames of the special illumination period is the same for each special illumination period and the emission spectrum of the special light is different for each special illumination period,
a second C emission pattern in which the number of frames of the special illumination period is different for each special illumination period and the emission spectrum of the special light is the same for each special illumination period, and
a second D emission pattern in which the number of frames of the special illumination period is different for each special illumination period and the emission spectrum of the special light is different for each special illumination period.

7. The endoscope system according to claim 4, wherein the lesion candidate region is detected by picking up the image of the observation target by illumination with the second emission pattern.

8. The endoscope system according to claim 4, wherein the special image signal acquired by picking up the image of the observation target by illumination with the second emission pattern is not used for image display.

9. A method of operating an endoscope system including a display having a main screen on which an observation image is displayed or having the main screen and a subscreen provided at a different position from the main screen, and an image control processor, the method comprising following steps executed by the image control processor:
performing, in a case where a first lesion candidate image is detected at a time of first observation in which an endoscope insertion part moves from an insertion opening to an end position of an observable range inside a lumen, an automatic capture of automatically capturing the first lesion candidate image in association with first positional information and performing, in a case where a second lesion candidate image is detected at a time of second observation in which the endoscope insertion part moves from the end position of the observable range to the insertion opening inside the lumen, an automatic capture of automatically capturing the second lesion candidate image in association with second positional information;
storing the first lesion candidate image and the first positional information obtained by the automatic capture in a captured image storage memory;
performing positional information comparison processing between the first positional information and the second positional information and performing, in a case where the first positional information and the second positional information match, image comparison processing between the first lesion candidate image and the second lesion candidate image; and
executing one of following 1) to 3), in a case where a determination that a lesion candidate region is missing is made as a result of the image comparison processing:
1) Automatically newly displaying a subscreen on the display and automatically display the first lesion candidate image stored in the captured image storage memory on the subscreen;
2) Automatically displaying the first lesion candidate image stored in the captured image storage memory on the subscreen of the display; or 3) automatically switching display of the main screen from the observation image to the first lesion candidate image stored in the captured image storage memory.

* * * * *